United States Patent
Tsunekawa

(10) Patent No.: US 7,505,156 B2
(45) Date of Patent: Mar. 17, 2009

(54) IMAGE PROCESSING METHOD AND APPARATUS FOR REPRINTING WITH A DESIRED BINDING WIDTH HAVING DIFFERENT PRINT SETTINGS

(75) Inventor: Kiyohiro Tsunekawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1034 days.

(21) Appl. No.: 10/368,584

(22) Filed: Feb. 20, 2003

(65) Prior Publication Data
US 2003/0231320 A1 Dec. 18, 2003

(30) Foreign Application Priority Data
Feb. 20, 2002 (JP) ............... 2002-043322
Jan. 27, 2003 (JP) ............... 2003-017301

(51) Int. Cl.
*G06F 15/00* (2006.01)
*G06F 17/21* (2006.01)
(52) U.S. Cl. ................... 358/1.14; 358/1.1
(58) Field of Classification Search ........... 358/1.1, 358/1.8, 1.9, 1.13, 1.14, 1.15, 1.18, 402, 358/448, 474, 500; 382/276, 302; 709/201, 709/220; 399/193; 412/9, 33; 715/208
See application file for complete search history.

(56) References Cited

U.S. PATENT DOCUMENTS

| | | | | |
|---|---|---|---|---|
| 5,923,013 A | * | 7/1999 | Suzuki et al. | 235/375 |
| 6,470,363 B1 | * | 10/2002 | Kanerva et al. | 715/208 |
| 6,567,180 B1 | * | 5/2003 | Kageyama et al. | 358/1.15 |

* cited by examiner

Primary Examiner—Gabriel I Garcia
(74) Attorney, Agent, or Firm—Fitzpatrick, Cella, Harper & Scinto

(57) ABSTRACT

This invention provides an image processing method and apparatus capable of easily reprinting the same print data in various output forms at a high speed without any large-capacity storage device, in which when a page image corresponding to print data input from an external device is to be generated, the print data is analyzed to generate the page image, print data of at least one job is held, a page image of at least one page that is generated by analyzing the print data is held, and when reprinting is designated, either of the spooled print data and page image is read out to perform reprinting.

29 Claims, 25 Drawing Sheets

FIG. 4

```
JOB START COMMAND = JOB ID'
PRINT RESOLUTION = 600dpi
BINDING WIDTH SETTING COMMAND = 5mm                    ⎫
BINDING DIRECTION SETTING COMMAND = LEFT BINDING       ⎬ JL COMMAND
PRINT SURFACE DESIGNATION COMMAND = DOUBLE-SIDED
DISCHARGE PORT SELECTION COMMAND = DISCHARGE PORT 1
PDL SHIFT COMMAND = LIPS                               ⎭
PDL DATA START COMMAND                                 ⎫
SHEET SIZE SELECTION COMMAND = A4
  ⋮
CHARACTER PRINT COMMAND
  ⋮                                                    ⎬ PDL COMMAND
GRAPHIC DRAWING COMMAND
  ⋮
DISCHARGE COMMAND
  ⋮
PDL DATA END COMMAND                                   ⎭

JOB END COMMAND                                        } JL COMMAND
```

FIG. 9

| PRINT POSITION WITHIN BAND | DRAWING HEIGHT | DRAWING LOGIC | BG INFORMATION | START ADDRESS OF OBJECT | OFFSET | ADDRESS OF NEXT DRAWING INFORMATION |
|---|---|---|---|---|---|---|

805

FIG. 20
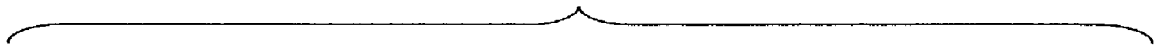
(a)
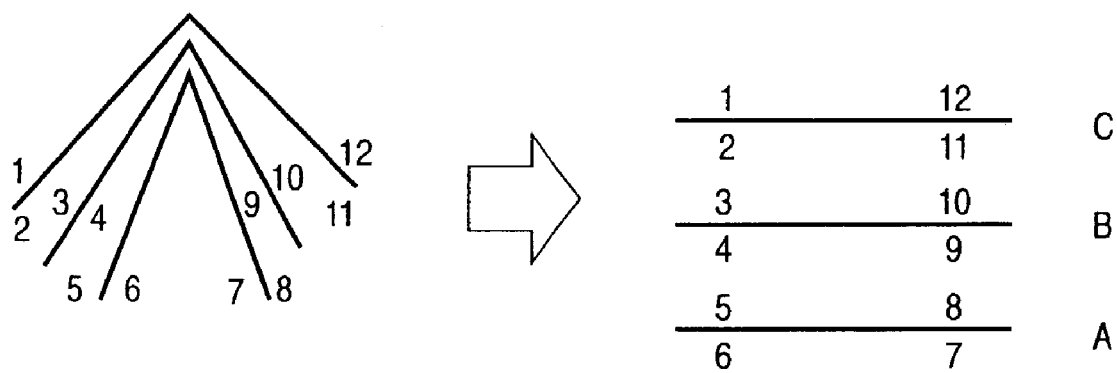
(b)

FIG. 21
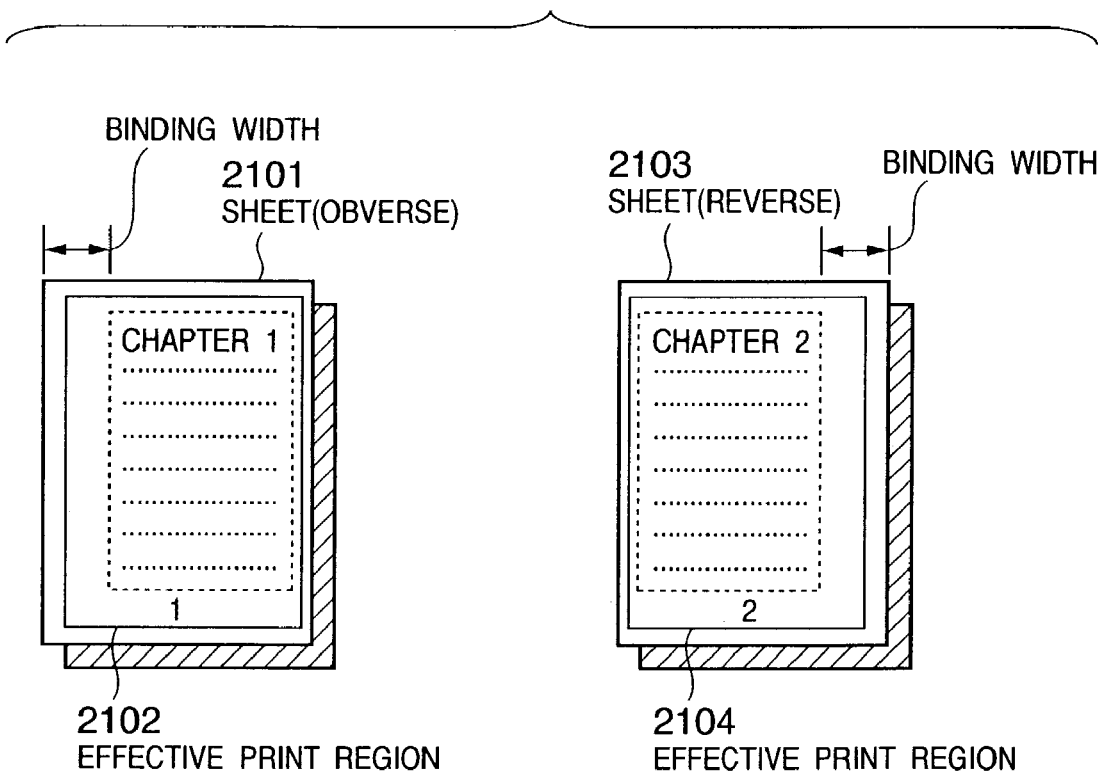
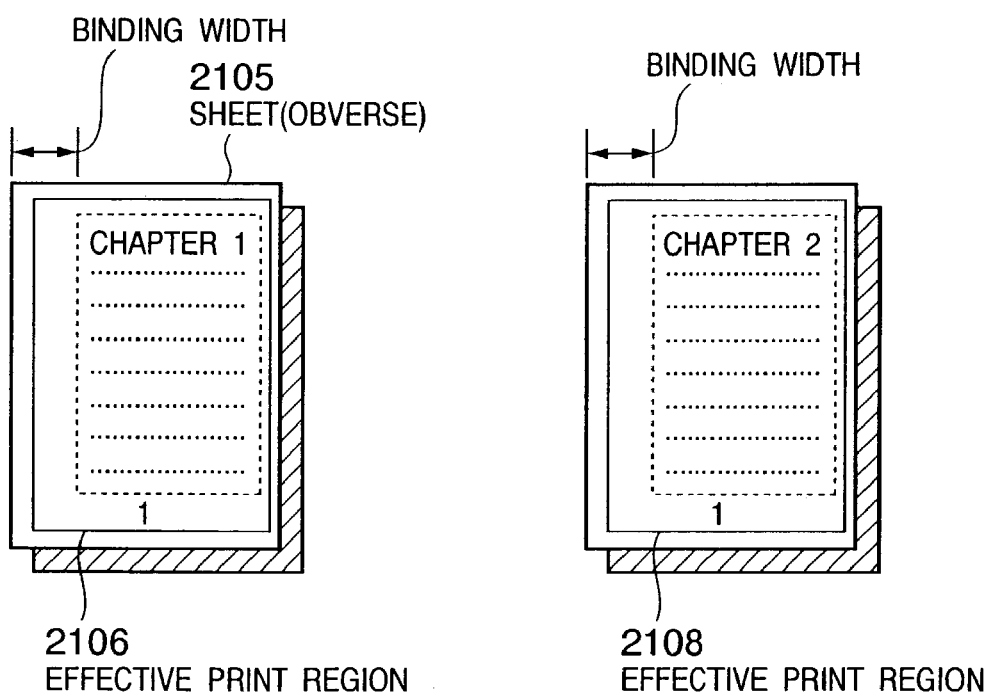

FIG. 25
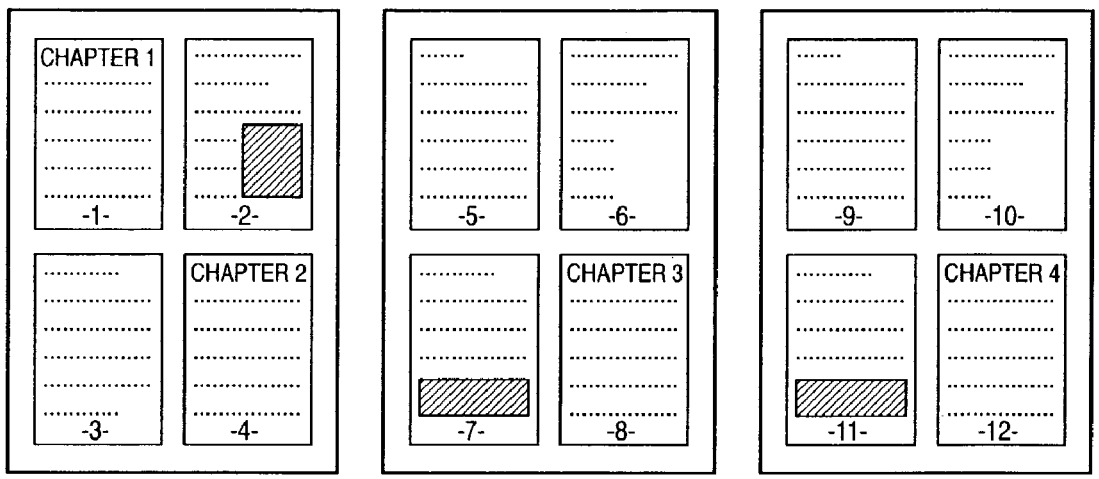
2501
SAVED IMAGE (4-UP DESIGNATION)
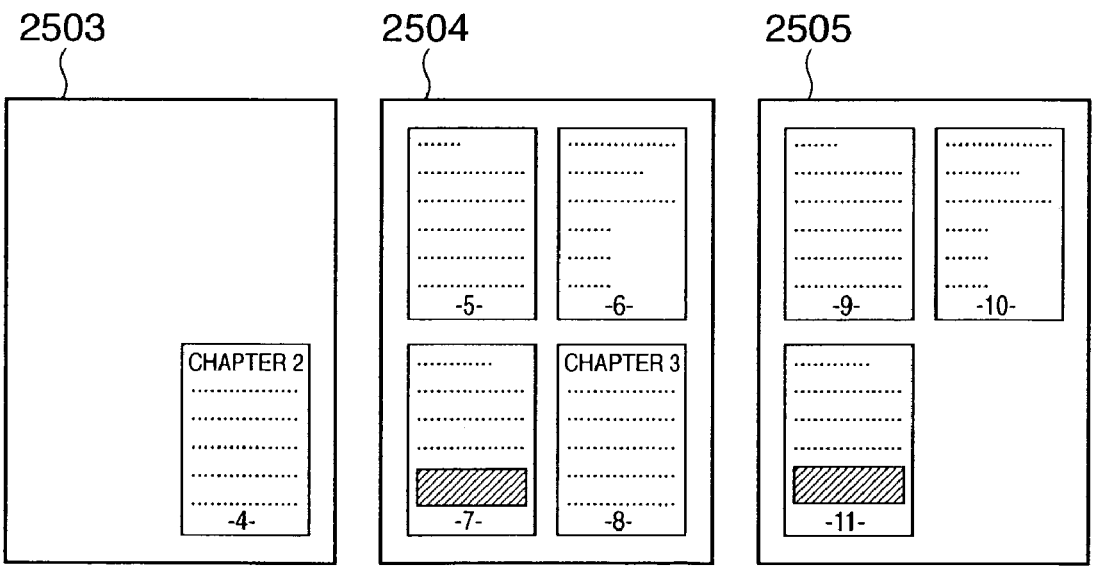
2502
REPRINTING
(4-UP DESIGNATION/PARTIAL
PRINTING OF PAGES 4 TO 11)

IMAGE PROCESSING METHOD AND APPARATUS FOR REPRINTING WITH A DESIRED BINDING WIDTH HAVING DIFFERENT PRINT SETTINGS

FIELD OF THE INVENTION

The present invention relates to an image processing method and apparatus and, more particularly, to an image processing method and apparatus capable of outputting input print data repeatedly.

BACKGROUND OF THE INVENTION

Recently, demands have arisen for speeding up a so-called reprint function (or multiple-copy printing) of holding a print job input once and printing part or all of the print job again in an image processing apparatus such as a page printer which analyzes an externally input print job to generate and output the image.

As a conventional technique for multiple-copy printing or high-speed printing, a generated page image (bitmap image) is spooled together with its page number in an external storage device. This page image is reused in second and subsequent output processes, which increases the reprinting speed without any labor of analyzing print data.

An advanced reprint function is also desired to enable outputting data again in a changed printing environment such that not only the same print result is output at a high speed, but also only part of a print job is printed midway, pages are printed in a reverse output order, pages are output at random, or pages which have been output by double-sided printing are printed by single-sided printing in reprinting.

A conventional page printer or the like is so constituted as to receive print data in a PDL (Page Description Language) format and generate a bitmap image representing a page content in accordance with the PDL analysis result. A general PDL is formed from various picture description commands such as a character print command and line drawing command, drawing commands such as an image drawing command, and various commands such as designation of a drawing logic or clipping area, a print position moving command, and a macro command of grouping a plurality of commands, storing them, and invoking them.

Further, the PDL generally includes commands for setting various printing environments. That is, the PDL includes various printing parameters for designating the line width, line type, line end shape processing method, font type, size, decoration (bold/italic), enlargement/reduction, rotational angle, drawing logic (AND or OR), and clipping area. When the image processing apparatus processes a line drawing command, character print command, or the like, an image is drawn in accordance with the contents of the current printing environment. Various printing environments keep setting contents valid until setting is executed again or a reset command or the like is received once setting is done. Hence, the current printing environment is also called a current graphic state. This arrangement eliminates repetition of the same setting, reduces the print data size, and realizes efficient PDL analysis processing. Some current graphic states automatically return to default values every time a page to be printed is changed. However, general current graphic states are kept valid between pages. It is inconvenient that the printing environment returns to default values every time the page changes in, e.g., a print mode in which text data is received, the print position automatically shifts along with character printing, and line feed and page feed are automatically done to print data.

As described above, a conventional page printer or the like which processes PDL data assumes analysis of PDL data sequentially from the start of a print job.

However, the prior art suffers the following problem.

More specifically, a bitmap image representing the content of one generated page is reused in multiple-copy printing or reprinting, and the conventional image processing apparatus cannot be applied to reprinting of different page contents. For example, when a print job by double-sided printing with a set binding width is reprinted by single-sided printing, the image offset direction changes between the obverse and the reverse. Even if designations for the binding width and binding direction do not change, a bitmap image generated for printing on the reverse cannot be printed on the obverse.

In this way, a generated image cannot be reused in various cases such as a change of the print resolution, change from color printing to monochrome printing, change of the binding width, binding direction, or offset amount, and change from printing of one page to printing of a plurality of pages.

As described above, it is difficult to reprint data by using a bitmap image upon a change in printing environment that may influence the content of a finally generated bitmap image.

To perform multiple-copy printing or reprinting without reusing any bitmap image, a print job (PDL data) is spooled, and a page image to be reanalyzed is generated. Since PDL data is reanalyzed in a new printing environment, this arrangement can cope with reprinting after changing various printing environments, but poses the following problem.

More specifically, in the conventional PDL, various printing environments can be inherited between pages. To determine a current graphic state at the start of analyzing an arbitrary page, contents set before the page must be grasped. Data analysis and environmental setting must be performed sequentially from the start of a print job including a page not subjected to actual printing even when pages are printed from the middle of a print job, or, e.g., only odd-numbered pages are partially printed. This is because the break position between pages (form feed command in a page printer or the like) must be distinguished from a binary code in image data or compressed data in order to identify the break position. It does not suffice to check only whether the break position coincides with the form feed code.

From this, when the printing environment is changed in multiple-copy printing or reprinting in an image processing apparatus having the PDL, it is difficult to increase the printing speed even when reprinting only an arbitrary page and subsequent pages within a print job or reprinting only some pages. Because of the same reason, reprinting in a reverse page order or reprinting in a changed page order cannot be efficiently processed.

For example, it is difficult to reprint data by designating book printing (dual page binding) for a print job assigned multiple-page printing in the first printing operation. The page orders of general 2-page printing and book printing will be explained with reference to FIGS. 20A and 20B. FIG. 20A represents a print job when general 2-page printing is done on two sheet surfaces, and FIG. 20B represents book printing. In FIG. 20A, pages 1 and 2, pages 3 and 4, ..., and pages 11 and 12 are respectively printed on the same sheet surfaces. In facedown discharge, the sheets are discharged in an order of A, B, and C shown on the right side of FIG. 20A. For this printing, pages in the print job must be arranged in 1, 2, 3, 4, ..., 11, and 12. For book printing, as shown in FIG. 20B, pages must be printed and discharged in an order of pages 6 and 7, pages 5 and 8, . . . , pages 2 and 11, and pages 1 and 12. Reprinting cannot utilize a generated bitmap image, and PDL data must be reanalyzed by reordering pages.

SUMMARY OF THE INVENTION

The present invention has been made to overcome the conventional drawbacks, and has as its object to provide an image processing method and apparatus capable of easily reprinting the same print data in various output forms at a high speed without any large-capacity storage device.

To solve the above problems, according to the present invention, an image processing apparatus which generates a page image corresponding to print data input from an external device comprises analysis means for analyzing the print data to generate a page image, print data spool means for holding the print data of at least one job, image spool means for holding a page image of at least one page that is generated by analyzing the print data, and reprint means for, when reprinting is designated, reading out either of the spooled print data and page image and performing reprinting.

The reprint means comprises printing environment check means for checking whether the page image is reusable, and when the page image is determined to be reusable as a result of the printing environment check means, performs reprinting by using the page image, while when the page image is determined not to be reusable, performs reprinting by reanalyzing the print data. The printing environment check means checks whether a printing environment value which influences a page image generation result has been changed in reprint designation, and determines whether the page image is reusable. The printing environment check means determines whether to reuse the page image or reanalyze the print data, at least once for one print job in a page unit. The analysis means comprises page information generation means for analyzing the print data to generate a page image and outputting the page information of the print data, and the print data spool means holds the print data and the page information together. The page information includes a start position of each page in the print data. The page information also includes printing environment information at start of each page. The printing environment includes various current graphic states necessary for drawing. The page image includes a set of image data obtained by dividing one page into a plurality of bands, or image data of one page. The image processing apparatus further comprises means for checking whether the page image can be stored in the image spool means, and when the page image is determined not to be able to be stored, only the print data is stored in the print data spool means. The reprint means comprises first determination means for determining a change of a print order of pages from reprint designation, reads out a page start position from the page information in an order complying with a result of the first determination means, and reprints the page image in the order. The reprint means comprises first determination means for determining a change of a print order of pages from reprint designation, sets a printing environment by reading out a page start position and the printing environment information from the page information in an order complying with a result of the first determination means, and reprints the page image in the order. The reprint means comprises second determination means for, when partial printing from a desired page of the print data is designated, determining for a designated page whether the page image is reusable, and reuses the page image in accordance with a determination result.

According to the present invention, an image processing method of generating a page image corresponding to print data input from an external device comprises the analysis step of analyzing the print data to generate a page image, the print data spool step of holding the print data of at least one job, the image spool step of holding a page image of at least one page that is generated by analyzing the print data, and the reprint step of, when reprinting is designated, reading out either of the spooled print data and page image and performing reprinting.

The reprint step comprises the printing environment check step of checking whether the page image is reusable, and when the page image is determined in the printing environment check step to be reusable, reprinting is performed using the page image, while when the page image is determined not to be reusable, the print data is reanalyzed to perform reprinting. In the printing environment check step, whether a printing environment value which influences a page image generation result has been changed in reprint designation is checked to determine whether the page image is reusable. In the printing environment check step, whether to reuse the page image or reanalyze the print data is determined at least once for one print job in a page unit. The analysis step comprises the page information generation step of analyzing the print data to generate a page image and outputting the page information of the print data, and in the print data spool step, the print data and the page information are held together. The page information includes a start position of each page in the print data. The page information also includes printing environment information at start of each page. The printing environment includes various current graphic states necessary for drawing. The page image includes a set of image data obtained by dividing one page into a plurality of bands, or image data of one page. The image processing method comprises the step of checking whether the page image can be stored in the image spool step, and when the page image is determined not to be able to be stored, only the print data is stored in the print data spool step. The reprint step comprises the first determination step of determining a change of a print order of pages from reprint designation, a page start position is read out from the page information in an order complying with a determination result, and the page image is reprinted in the order. The reprint step comprises the first determination step of determining a change of a print order of pages from reprint designation, a printing environment is set by reading out a page start position and the printing environment information from the page information in an order complying with a determination result, and the page image is reprinted in the order. The reprint step comprises the second determination step of, when partial printing from a desired page of the print data is designated, determining for a designated page whether the page image is reusable, and the page image is reused in accordance with a determination result.

According to the present invention, an image processing program of generating a page image corresponding to print data input from an external device comprises the analysis step of analyzing the print data to generate a page image, the print data spool step of holding the print data of at least one job, the image spool step of holding a page image of at least one page that is generated by analyzing the print data, and the reprint step of, when reprinting is designated, reading out either of the spooled print data and page image and performing reprinting.

The reprint step comprises the printing environment check step of checking whether the page image is reusable, and when the page image is determined in the printing environment check step to be reusable, reprinting is performed using the page image, while when the page image is determined not to be reusable, the print data is reanalyzed to perform reprinting. In the printing environment check step, whether a printing environment value which influences a page image generation result has been changed in reprint designation is checked to determine whether the page image is reusable. In the printing environment check step, whether to reuse the page image or reanalyze the print data is determined at least once for one print job in a page unit. The analysis step comprises the page information generation step of analyzing the print data to generate a page image and at the same time outputting the page information of the print data, and in the print data spool step, the print data and the page information are held together. The image processing program further comprises the step of checking whether the page image can be stored in the image spool step, and when the page image is determined not to be able to be stored, only the print data is stored in the print data spool step. The reprint step comprises the first determination step of determining a change of a print order of pages from reprint designation, a page start position is read out from the page information in an order complying with a determination result, and the page image is reprinted in the order. The reprint step comprises the first determination step of determining a change of a print order of pages from reprint designation, a printing environment is set by reading out a page start position and the printing environment information from the page information in an order complying with a determination result, and the page image is reprinted in the order. The reprint step comprises the second determination step of, when partial printing from a desired page of the print data is designated, determining for a designated page whether the page image is reusable, and the page image is reused in accordance with a determination result.

With the above arrangement, according to the present invention, PDL data and a bitmap image are spooled together in the first printing. In reprinting, whether the printing environment has been changed is checked. If a generated bitmap image representing the content of one page is reusable, the bitmap image is reused to perform reprinting at a high speed. Only in reprinting with a different page content, the PDL data is reanalyzed to perform printing. As a result, advanced reprint means can be provided.

With the above arrangement, according to the present invention, the page start position in PDL data and the current graphic state at the start of each page are held. Even an image processing apparatus using the PDL which allows inheriting various current graphic states between pages need not analyze data sequentially from the start of a print job. Reprinting of printing some pages from an intermediate page of the print job can be processed at a high speed.

The bitmap image is not reused only when the printing environment is changed. In reprinting after double-sided printing with a set binding width is changed to single-sided printing, PDL data is reanalyzed for only a reverse page, and a bitmap image can be reused for an obverse page.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 4 is a view showing an example of a print job (print command) for executing general printing from a host computer to the image processing apparatus;

FIG. 9 is a view showing the structure of drawing information;

FIG. 20 is a view for explaining page orders in general 2-page printing and book printing, respectively;

FIG. 21 is a schematic view showing print results in pages with a set binding width in double-sided printing and single-sided printing;

FIG. 25 is a view showing a page image example of reprint data by N-up designation, and an output result example obtained when partial printing is assigned to the reprint data.

DETAILED DESCRIPTION OF THE PREFERRED EMBODIMENT

A preferred embodiment of the present invention will be described below with reference to the accompanying drawings.

<Arrangement Example of Image Processing Apparatus According to Embodiment>

The arrangement of an image processing apparatus according to the embodiment to which the present invention is preferably applied will be explained with reference to FIGS. 1 and 2.

Figure 1:
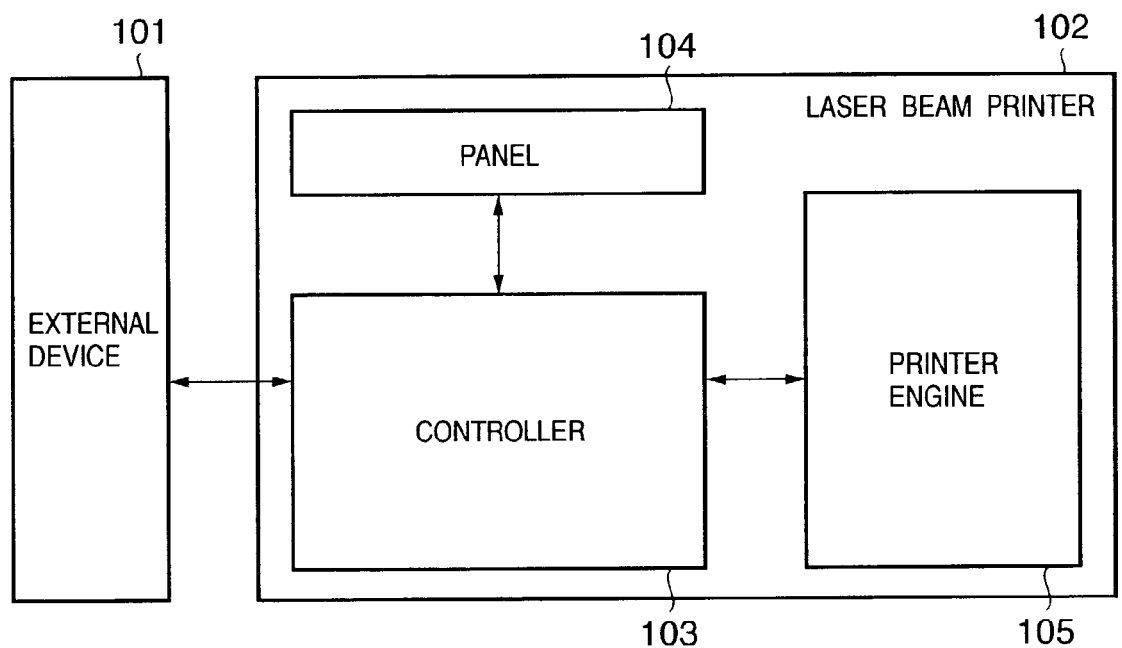
FIG. 1 is a block diagram for explaining the schematic arrangement of a laser beam printer to which the present invention can be applied.

FIG. 1 is a block diagram showing the schematic structure of the image processing apparatus according to the embodiment, and shows, e.g., a laser beam printer. The image processing apparatus to which the present invention can be applied is not limited to a laser beam printer, and can be applied to another print type printer apparatus regardless of the difference in arrangement such as a monochrome/color printer. The image processing apparatus is not limited to a printer as far as the functions of the present invention are executed. The present invention can also be applied to a print-dedicated device such as a printer controller or print server, a printer driver installed in a general computer, and control of an image printing apparatus, image display apparatus, and image communication apparatus which require the same image processing.

In FIG. 1, reference numeral 101 denotes an external device such as a host computer; and 102, a laser beam printer main body according to this embodiment.

The laser beam printer 102 receives print data (character code, graphic data, image data, or the like) in the PDL (Page Description Language) format from the external device 101. The laser beam printer 102 creates a corresponding character pattern, graphic pattern, or the like in accordance with the information, and forms an image on a print sheet serving as a print medium. The laser beam printer 102 can register a character pattern, form data, macro data, or the like in a data storage (not shown). Similar to print data received from the host computer, the laser beam printer 102 generates a page image in accordance with print data in the storage.

In the laser beam printer 102, reference numeral 103 denotes a printer controller which controls the whole laser beam printer 102 and analyzes print data (character information or the like) supplied from the host computer 101. The controller 103 is connected to a printer engine 105, generates page information from dot data based on the print data, and sequentially transmits dot data (video signals) to the printer engine 105.

The printer engine 105 actually forms a latent image on a photosensitive drum in accordance with the dot data (video signals), and thermally fixes the image onto a sheet, printing the image. Reference numeral 104 denotes an operation panel which has operation switches, an LED display, and the like. The operator (user) operates the operation panel 104 to instruct the laser beam printer 102 of a predetermined operation or to set a printing environment.

Figure 2:
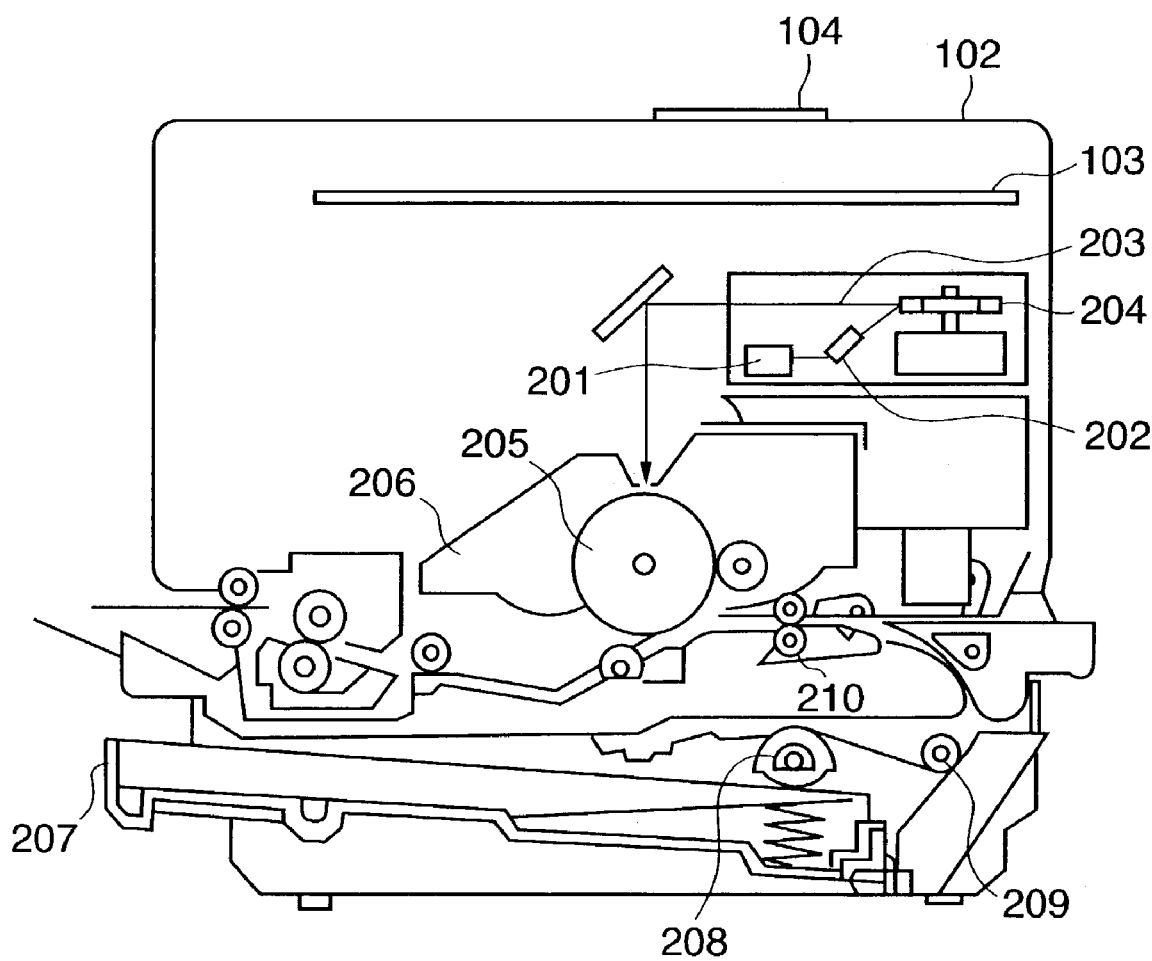
FIG. 2 is a sectional view showing the internal structure of the laser beam printer according to an embodiment.

FIG. 2 is a sectional view showing the internal structure of the laser beam printer 102 according to the embodiment, and mainly shows the arrangement of the printer engine 105. The same reference numerals as in FIG. 1 denote the same parts, and a description thereof will be omitted.

In FIG. 2, a laser driver 201 is a circuit for driving a semiconductor laser 202, and switches the ON/OFF state of a laser beam 203 emitted by the semiconductor laser 202 in accordance with a video signal output from the controller 103. The laser beam 203 is oscillated right and left by a rotary polygon mirror 204, and scans the surface of an electrostatic drum 205. As a result, the electrostatic latent image of a character pattern or the like is formed on the electrostatic drum 205. The latent image is developed by a developing unit 206 around the electrostatic drum 205, and then transferred onto a print sheet. The print sheet is a cut sheet, and cut print sheets are stored in a sheet cassette 207 mounted in the LBP 102. A print sheet is fed into the apparatus by a pickup roller 208 and convey rollers 209 and 210, and supplied to the electrostatic drum 205.

Figure 3:
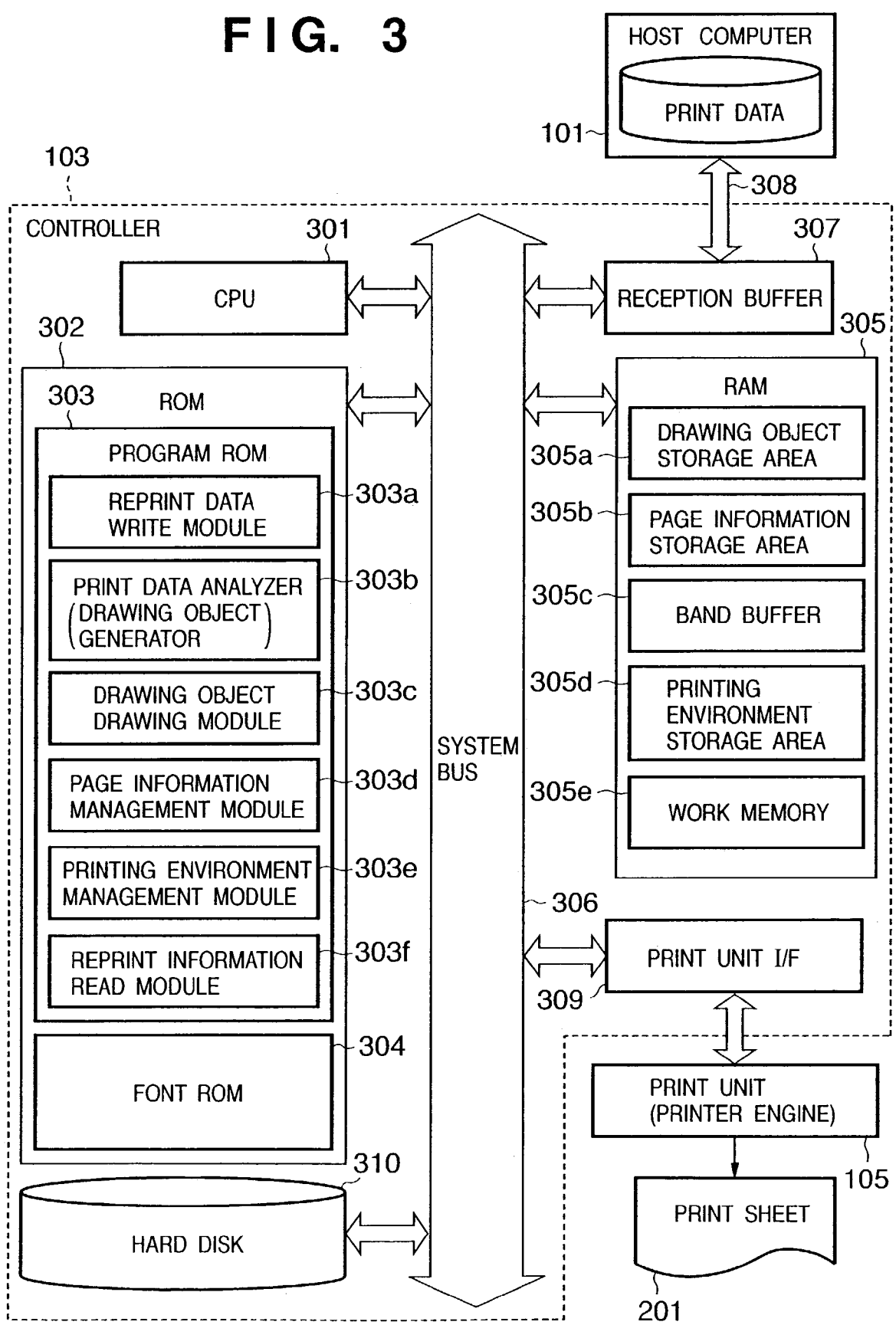
FIG. 3 is a block diagram for explaining the basic arrangement of the controller of an image processing apparatus according to the embodiment.

FIG. 3 is a block diagram for explaining the basic arrangement of the image processing apparatus according to the embodiment, and shows the internal arrangement of the controller 103 in the image processing apparatus of FIG. 1. Note that the image processing apparatus may be a single apparatus or a system which performs processing by a plurality of devices arranged via a network such as a LAN as far as the functions of the present invention are executed.

In FIG. 3, the printer controller 103 is connected to the host computer 101 serving as an external device via a predetermined interface 308, and executes predetermined print processing in accordance with print data sent from the host computer 101. Print data received from the host computer 101 is temporarily stored as reception data in a reception buffer 307.

Reference numeral 301 denotes a printer CPU which comprehensively controls access to various devices connected to a system bus 306 on the basis of a control program stored in a program ROM 303 of a ROM (Read-Only Memory) 302. The printer CPU 301 analyzes print data stored in the reception buffer 307, and generates drawing objects of at least one page (print data analyzer; drawing object generator 303*b*). Subsequently, the printer CPU 301 generates a raster image (image data) of one page (or one of a plurality of divided bands) on the basis of the drawing objects (drawing object drawing module 303*c*; to be also referred to as an image data drawing means). The printer CPU 301 outputs a video signal including ON/OFF bits of the raster image to the print unit (printer engine) 105 via a print unit I/F 309 (output of a video signal will be referred to as "ship" hereinafter). The printer engine 105 prints an image on a print sheet 201 on the basis of the video signal received from the printer CPU 301.

In a banding system in which a plurality of (e.g., two) band rasters obtained by dividing a page into bands are prepared to perform printing, generation of a raster image and shipping operation are simultaneously executed. That is, while one drawn band raster is shipped, a drawing object belonging to the other band raster is drawn.

In addition to the above arrangement, the program ROM 303 stores programs for realizing the following functions. That is, the program ROM 303 comprises a page information management module 303*d* which checks the break position of each page in print data in accordance with the analysis result of the print data analyzer 303*b* and generates the result as page information, a printing environment management module 303*e* which generates a printing environment where the print data analyzer 303*b* starts processing of a new page, a print data write module 303*a* which writes in a hard disk 310 a raster image generated by the image data drawing means 303*c* together with the print data, page information, and printing environment data, and a reprint information read module 303*f* which reads out the print data, page information, and printing environment data, or a raster image stored in the hard disk 310 when print data in the reception buffer 307 is a reprint designation command. The print data, page information, printing environment data, and raster image will be called reprint data.

Upon reception of a reprint designation command, the print data analyzer 303b checks whether reprint data to be read out is saved in the hard disk 310, in accordance with the parameter of the reprint designation command and a printing environment at this time. The print data analyzer 303b obtains a reprint page order and page range, invokes the reprint information read module 303f on the basis of the results, and performs reprinting. The print data analyzer 303b can determine which of print data and page information, or a raster image is to be read out.

The ROM 302 is also used as a memory (font ROM 304) which stores font data formed from dot fonts and scalable fonts used for character output.

Reference numeral 305 denotes a RAM which functions as a main memory, work memory, or the like for the CPU 301. The memory capacity of the RAM 305 can be expanded by an optional RAM connected to an expansion port (not shown). The RAM 305 comprises a drawing object storage area 305a which stores a drawing object generated by the print data analyzer 303b, a work memory 305e temporarily used by the control program 303, a band buffer 305c which stores raster images corresponding to two band areas obtained by dividing one page into bands, a page information storage area 305b which temporarily stores page information generated by the page information management module 303d, and a printing environment storage area 305d which temporarily stores printing environment data generated by the printing environment management module 303e. In addition, the RAM 305 is used as a font cache memory (not shown) for caching a character pattern mapped on the basis of scalable data in the font ROM 304.

In this embodiment, printing is performed by the banding system. It is also possible to form the buffer 305c as a page buffer capable of holding raster images of one page and perform drawing/shipping processing by a full-paint system. The banding and full-paint systems may be switched in accordance with designation from the panel or the like, or either one of them may be permanently adopted. The laser beam printer 102 receives power from a power supply (not shown). Print data is stored in the hard disk 310 in the above description, but may be stored in a nonvolatile memory such as a flash memory, the RAM 305, or another storage device.

The arrangement which constitutes the present invention is supplied as a program stored in a ROM in the above description, but may be supplied by a medium such as a floppy disk or hard disk, loaded to a RAM or the like before execution, and then executed. The present invention can also be practiced by installing a control program from a storage medium such as a CD-ROM, CD-R, memory card, or DVD via a drive (not shown) and controlling the image processing apparatus. The present invention includes this implementation.

<Example of General Print Job Operation of Image Processing Apparatus According to Embodiment>

(Structural Example of General Print Job)

A format of a print command which constitutes a print job for executing general printing from the host computer to the image processing apparatus will be explained with reference to FIG. 4.

The start and end of a print job are described in a JL (Job Language), and include the following commands which designate various environments (job environments) uniform within the print job.

Job start command representing the start of a print job (job ID=JOBID' is designated as a parameter).

Print resolution designation command (600 dpi in this embodiment) which sets a print resolution used to process subsequent print data in the PDL data format Binding width setting command (5 mm) and binding direction setting command (left binding) that designate the mapping position of a print content on a sheet in binding the sheet Print surface designation command (double-sided) which designates whether to perform printing on one side or two sides of a sheet Discharge port selection command (discharge port 1=face-down)

PDL shift command which designates activation of a PDL analysis program in order to process print data (LIPS is activated)

These commands are JL commands (to be referred to as a job environment setting command hereinafter), and are described in the PDL.

PDL data start command representing the start of PDL data

Sheet size selection command (A4) which selects the sheet size of each page

Character print command

Graphic drawing command

Discharge command

PDL data end command which means the end of PDL data

Job end command which defines the end of the print job by the JL (General Print Job Processing)

A general print data processing sequence without any reprint designation in the image processing apparatus of the embodiment will be described with reference to the flow chart of FIG. 5.

In this embodiment, reprinting is designated by the reprint designation command within print data, and the reprint designation command is designated prior to another drawing command such as character drawing. In processing any drawing command, the image processing apparatus according to the embodiment can determine whether the print job is a general print job or a reprint-designated print job. For descriptive convenience, no reprint designation command is issued before a drawing command in the flow chart of FIG. 5.

Figure 5:
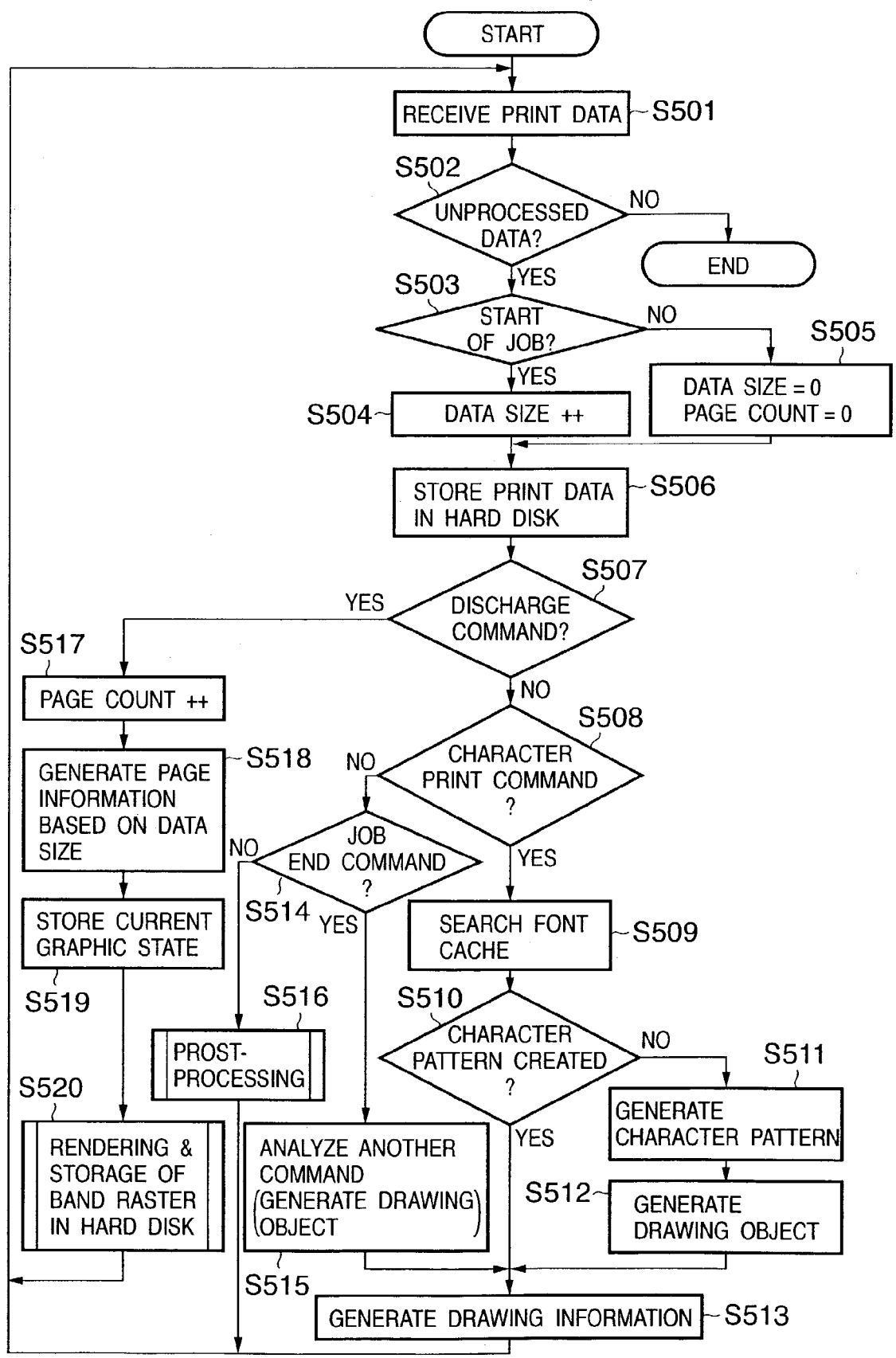
FIG. 5 is a flow chart showing a general print data processing sequence without any reprint designation in the image processing apparatus according to the present invention.

In step S501 of FIG. 5, the control program 303 stores in the reception buffer 307 print data sent from the host computer 101 via the predetermined interface 308. The control program 303 checks whether unprocessed print data exists in the reception buffer 307 (step S502), and if NO in step S502, ends the processing. If YES in step S502, the control program 303 analyzes the print data in step S503 and subsequent steps.

In step S503, the control program 303 checks whether the print data is the start of a print job. In other words, the control program 303 checks whether the received print data is a job start command, and if NO in step S503, initializes the processed data size and the processed-page count to 0 (step S505). If YES in step S503, the control program 303 increments the data size by the processed size (step S504). This data size is referred to in step S516 when the page break position is stored as page information. Note that an ID capable of uniquely identifying the print job is given as a job start command parameter. In reprinting, a print job to be output is determined by the job ID.

In step S506, the print data temporarily stored in the reception buffer 307 is stored in the hard disk 310. The job ID of the print job is stored in the work memory at the start of the job in step S505, and stored in the hard disk together with the print data.

(Example of Initial Storage in Hard Disk 310)

Figure 6:
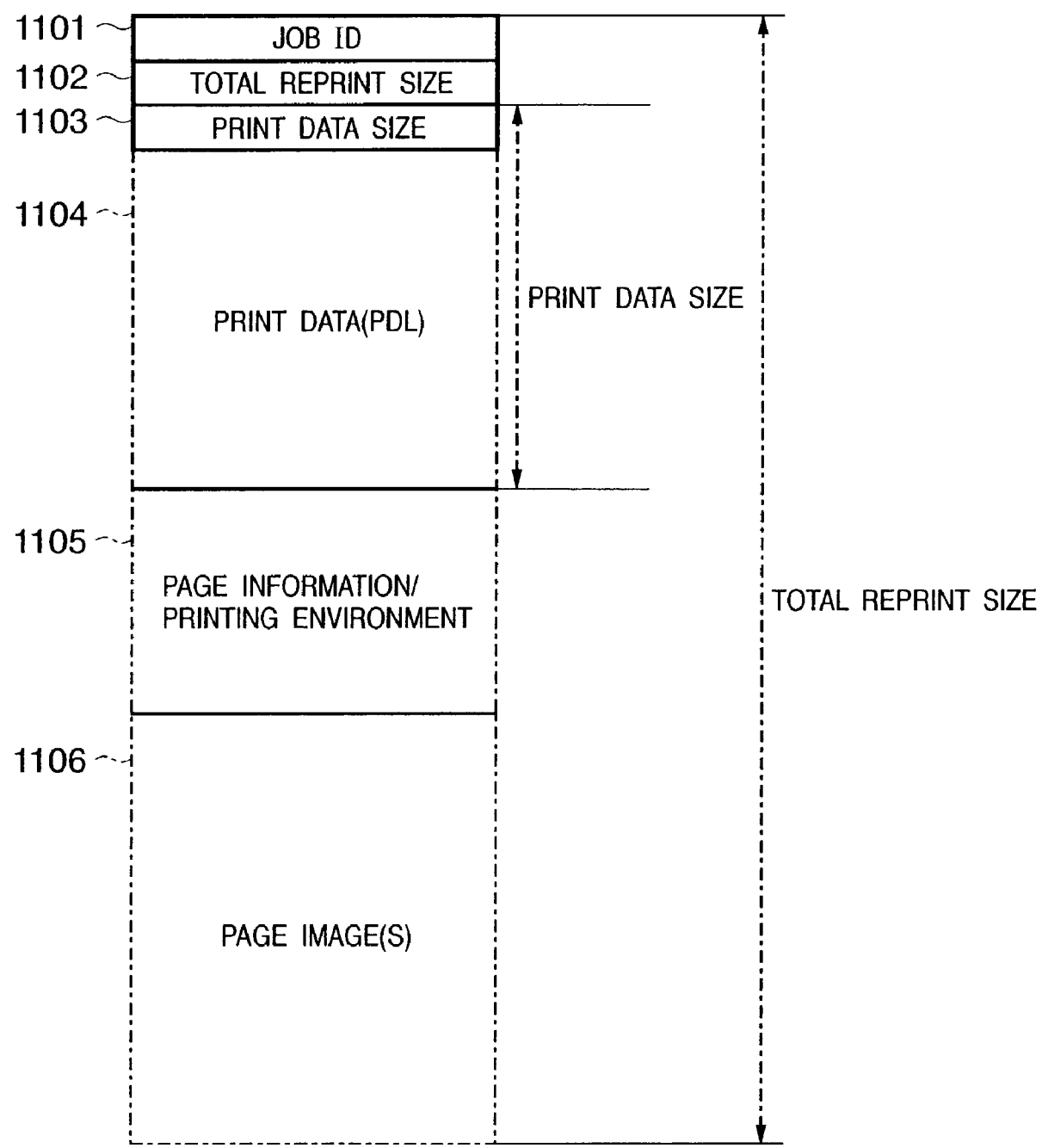
FIG. 6 is a view showing the whole structure of reprint data stored in a hard disk 310 upon reception of a job start command.

A data structure stored in the hard disk will be explained with reference to FIG. 6. FIG. 6 is a view showing the structure of reprint data stored in the hard disk 310. In FIG. 6, a correct value is written as a job ID 1101 at the start of a job. As for a total reprint size 1102 and print data size 1103, only areas are ensured (values are set by rewrite in job end post-processing; steps S1209 and S1212 in FIG. 13). The areas of print data 1104 and page image(s) 1106 are added every time print data is received, and the area of page information/printing environment 1105 is stored at the end of the job.

Referring back to the flow chart of FIG. 5, unprocessed print data, i.e., print commands in the page description language format are sequentially analyzed in step S507 and subsequent steps. The control program 303 checks whether the print data is a discharge command (form feed code) (step S507). If NO in step S507, the control program 303 keeps analyzing the print data as another print command in step S508 and subsequent steps. In this embodiment, a character print command will be exemplified as a main drawing command, and a description of other commands will be omitted. Page analysis sequences for them are the same as a known page description language analysis sequence.

In analysis when the print command is not a discharge command, the control program 303 checks in step S508 whether the print command is a character print command. If NO in step S508, the control program 303 checks in step S514 whether the print command is a job end command. If NO in step S514, the control program 303 generates a proper drawing object as another print command such as graphic drawing (step S515). If YES in step S514, the control program 303 executes post-processing for reprint data in step S516 (details of which will be described with reference to the flow chart of FIG. 13), and returns to step S501.

If YES in step S508, the control program 303 checks whether the same character pattern has been created in the font cache storage (steps S509 and S510). If YES in step S510, i.e., hit in retrieval, the control program 303 creates drawing information necessary to draw the character pattern (step S513). If NO in step S510, the font scaler generates a character pattern corresponding to the character code assigned a current font (step S511), generating a drawing object (step S512).

In this embodiment, a drawing object representing a character pattern is a bitmap pattern. However, the present invention is not limited to this, and characters equal to or smaller than a specific pattern size may be processed, e.g., compressed by a specific compression format. After that, similar to hit in retrieval, the control program 303 creates drawing information and ends the analysis of one command.

(Structural Examples of Drawing Object and Drawing Information)

Figure 7:
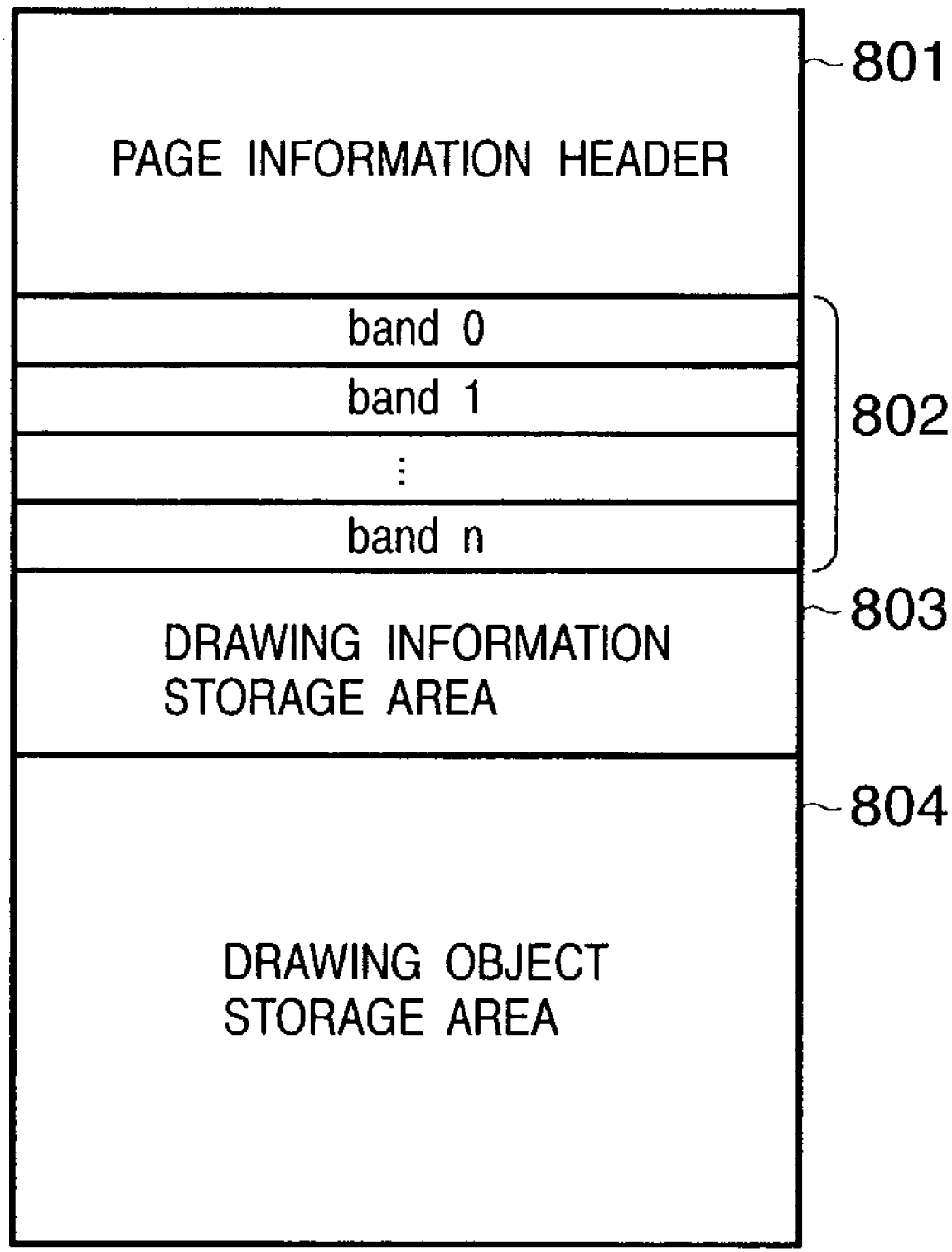
FIG. 7 is a view showing a memory map representing the contents of a drawing object storage are 305a for one page.
Figure 8:
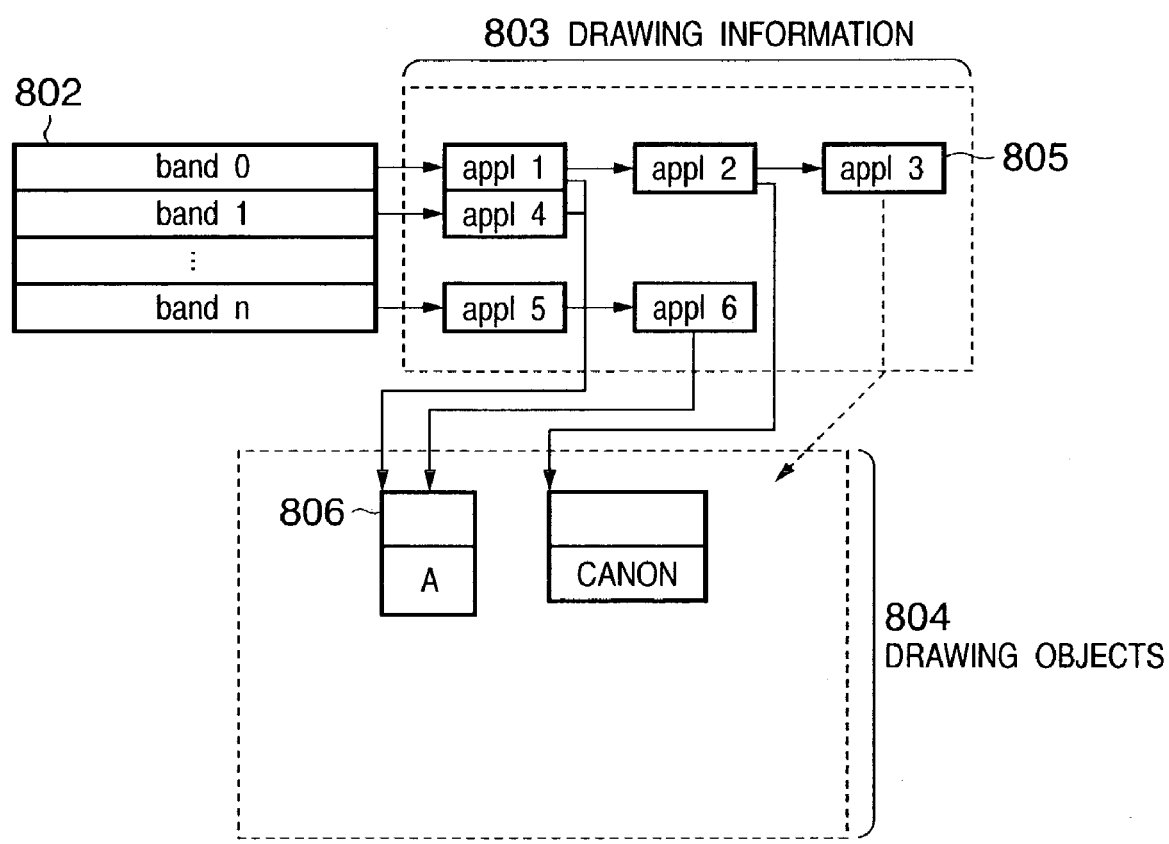
FIG. 8 is a block diagram schematically showing links between drawing information and the drawing object.

The structures of a drawing object and drawing information in the embodiment will be explained with reference to FIGS. 7 to 9. FIG. 7 is a view showing the memory map of the drawing object storage area 305a for one page in the embodiment. FIG. 8 is a view showing a schematic structural example of the drawing object. FIG. 9 is a view showing a schematic structural example of drawing information.

In FIG. 7, reference numeral 801 denotes a page information header which stores various pieces of information of each page. The page information header 801 is made up of pieces of information to be managed every page, such as the print resolution of a page, sheet size, color mode, the number of band rasters, the total capacity (memory use amount) of drawing objects belonging to the page, page state (drawn, during shipping, or the like), and the number of pages sequentially counted after power-on. The print resolution and the like are determined in the current graphic state at the start of processing each page. The number of band rasters can be obtained from the sheet size and print resolution with a fixed height of each band. Reference numeral 802 denotes band tables which are prepared by the number of band rasters and linked to drawing information 803 (see FIG. 8). As will be described later, each drawing information represents the position and printing method of each drawing object within a band.

The drawing information will be called an application (appl). In this embodiment, each application 805 and drawing object 806 are respectively generated and held in the drawing information storage 803 and a drawing object storage are 804, but may be held together.

FIG. 9 is a schematic view showing the structure of one application. The application includes the following information as information for drawing a drawing object. That is, the application includes the print position (bit offset value from the upper left end) within a band, the drawing height of a drawing object, the drawing logic (AND, OR, or the like) with a band raster, background information (BG information), the start address of the drawing object, the offset amount (number of lines) representing the distance by which the drawing object is skipped when the drawing object is drawn in the middle of the band, and the start address of the next application (NULL at the end of the link). BG information is formed from the gray level, and a dither pattern corresponding to the gray level is pasted as the background of each drawing object in drawing.

When a drawing object is drawn over a plurality of bands, the drawing object has a plurality of applications, i.e., is assigned applications by the drawing count. In the example of FIG. 8, a character "A" is drawn over band 0 and band 1 by appl 1 and appl 4, and drawn within band n by appl 6.

Each information within the application suffices to have at least the number of bits expressible at a designated resolution on a designated sheet. The link between applications or to a drawing object is not limited to an address within the RAM, and may be an ID link (in this case, the link is converted into an address via an ID table prepared in advance).

To draw each drawing object every band and generate a band image by the above-described arrangement, linked applications are sequentially read out from the band table, and a drawing object is drawn in accordance with print position information stored in each application. This processing is repeated until the next application address reaches NULL, ending drawing processing of one band.

Referring back to FIG. 5, if the print command is determined in step S507 to be a discharge command, the control program 303 increments the processed-page count (step S517), and stores the current data size (number of bytes from the start of the print job) and the incremented-page count (1 for the first page) as page information in the page information storage are 305b (step S518). In step S519, the control program 303 stores the current printing environment (current graphic state) in the printing environment storage are 305d.

(Structural Examples of Page Information and Printing Environment)

The structures of page information and printing environment generated in steps S518 and S519 of FIG. 5 will be described with reference to FIGS. 10 and 11. The following structures are used for temporary storage in the page information storage are 305b of FIG. 3.

Figure 10:
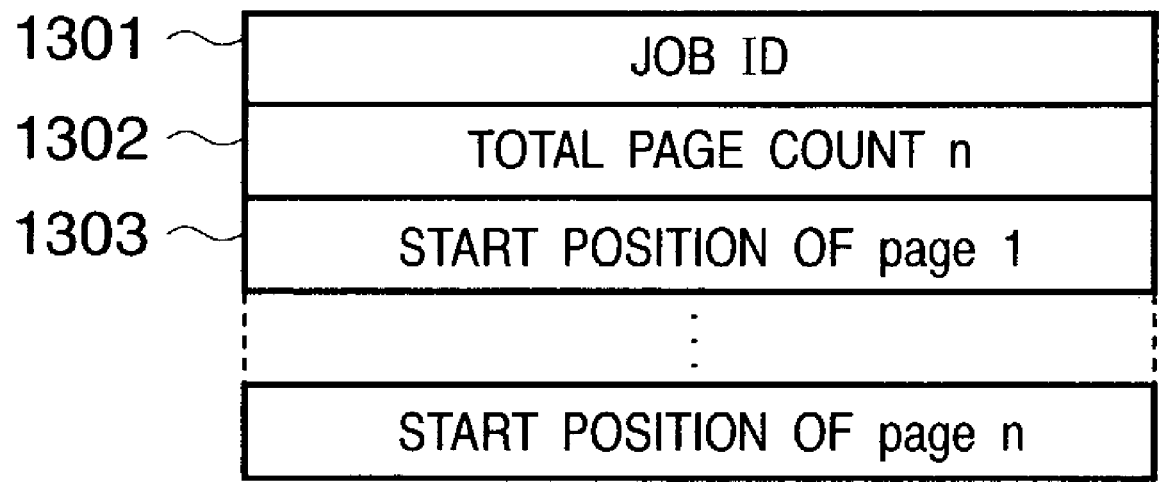
FIG. 10 is a view showing the structure of page information generated in step S518 of FIG. 5.

Page information shown in FIG. 10 is formed from a job ID (1301) for uniquely identifying a print job, a total page count n (1302) of the print job, and the start positions (1303) of pages 1 to n. In this case, it is also possible to assign only a storage area to the total page count n, and finally write a correct value in post-processing (step S516) at the end of a job after all pages are processed. Alternatively, the processed-page count to be incremented may be overwritten every page. The start position 1303 of each page represents the number of processed data bytes from the start of a job at the start of each page. The start position of page 1 represents the number of processed bytes at the start of PDL data. The start position of page n represents the number of processed bytes when a discharge command for page n−1 is processed.

Figure 11:
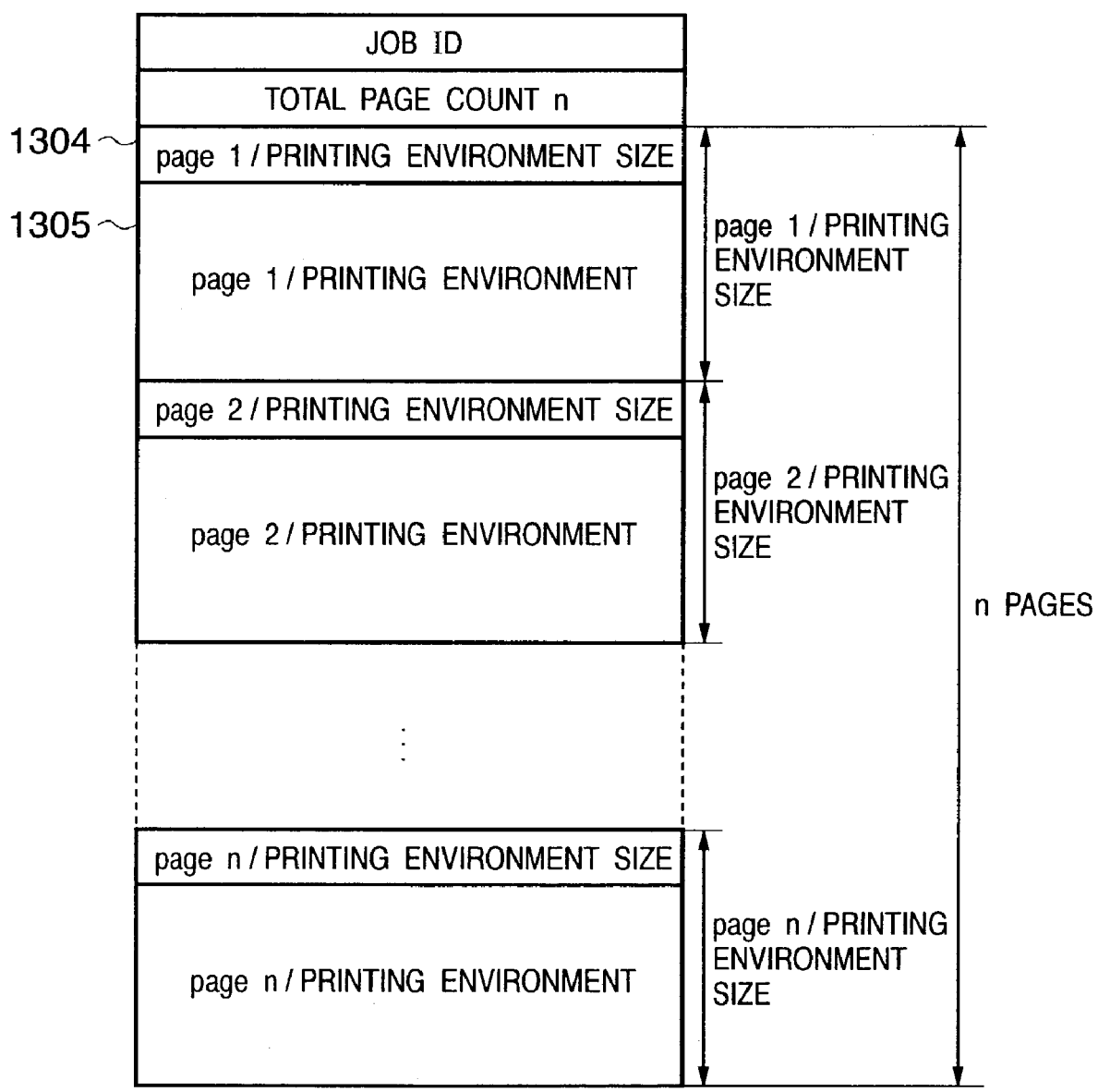
FIG. 11 is a view showing the structure of a printing environment generated in step S519 of FIG. 5.

FIG. 11 shows the structure of a printing environment in temporary storage in the printing environment storage are 305d. This structure is comprised of a printing environment data size (1304) for each page and an actual printing environment (1305) in addition to the total page count n.

Figure 12:
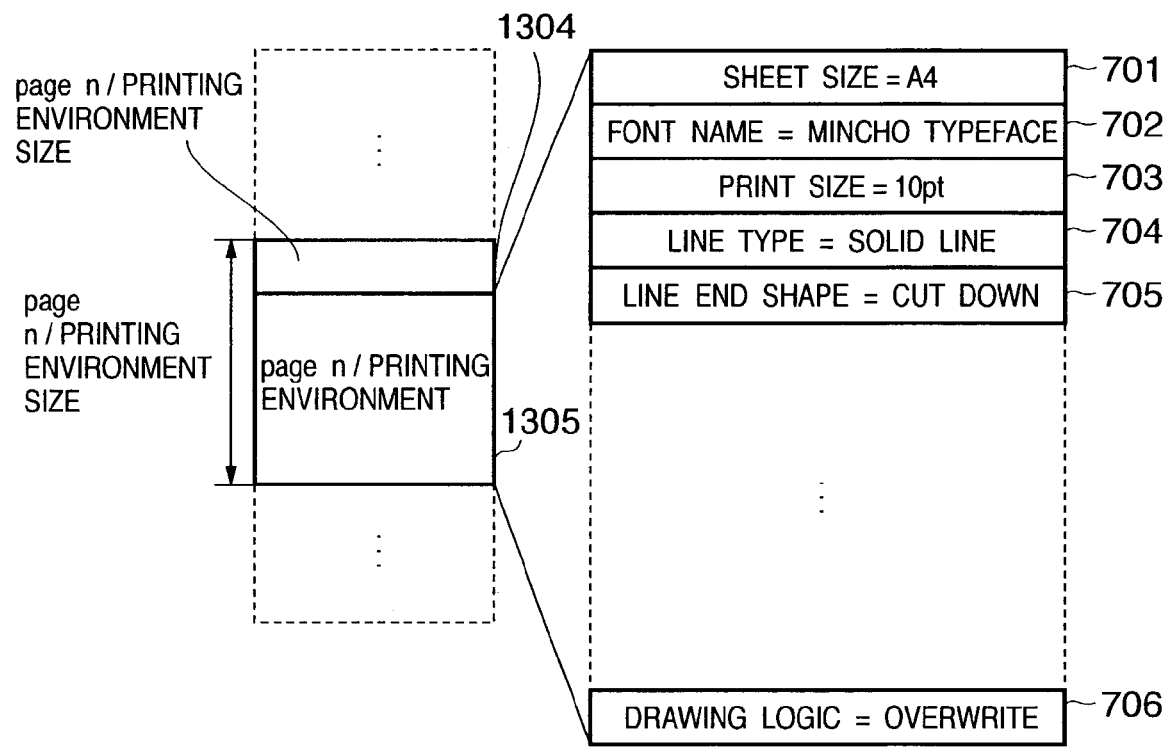
FIG. 12 is a view showing a more detailed structure of the printing environment (current graphic state) generated in step S519 of FIG. 5.

FIG. 12 is a view showing a more detailed structure of a printing environment (current graphic state) generated in step S519 of FIG. 5. The right side of FIG. 12 illustrates an example of a printing environment at the start of each page. In FIG. 12, reference numeral 701 denotes a sheet size (=A4) temporarily stored at the page information header 801; 702, a current font name (=Mincho typeface); 703, a current font size (=10 points); 704, a line type (=solid line); 705, a line end processing shape (=cut down); and 706, a drawing logic (=overwrite).

In addition to these parameters, the printing environment suffices to include graphic information necessary for drawing processing by each image processing apparatus to which the present invention is applied. For example, if the sheet size cannot be changed within one print job, the sheet size 701 is stored as a job environment (to be described later).

In the above embodiment, all current graphic states are held every time a discharge command is processed. It is also possible to calculate the difference from a predetermined default environment and hold only the difference. (the default environment is a job environment stored in the hard disk at the start of a job, and prepared in advance in the program ROM 303). Although not shown in FIG. 12, only the printing environment of page 1 is stored when processing the first drawing command.

Referring back to the flow chart of FIG. 5, the control program 303 stores a rendered/generated bitmap image in step S520. More specifically, a bitmap image expressing a page content is drawn using the drawing object and drawing information of one page according to a known banding method. At the same time, the drawn bitmap image of the band is output as a bit signal to the printer engine 105, and output as a file to the hard disk 310. After rendering of one page and storage in the hard disk 310 end, the control program 303 returns to step S501 in order to analyze print data of the next data.

In this embodiment, the next print data is analyzed after rendering of one page for descriptive convenience. In an image processing apparatus such as a laser beam printer, rendering and print data analysis are generally performed at the same time by multitask processing. Note that bitmap images of one page may be temporarily held in the RAM and stored at once in the hard disk 310 after one page is rendered. Alternatively, bitmap images may be sequentially stored every band.

Simultaneously when each page is printed by the above-described processing sequence, a bitmap image is spooled. Page information and a current graphic state are generated and spooled as reprint data together with print data.

(Execution Example of Job End Command)

A data structural example as a result of merging page information in FIG. 10 and the printing environment in FIG. 11 by a job end command will be described with reference to FIG. 14.

Figure 14:
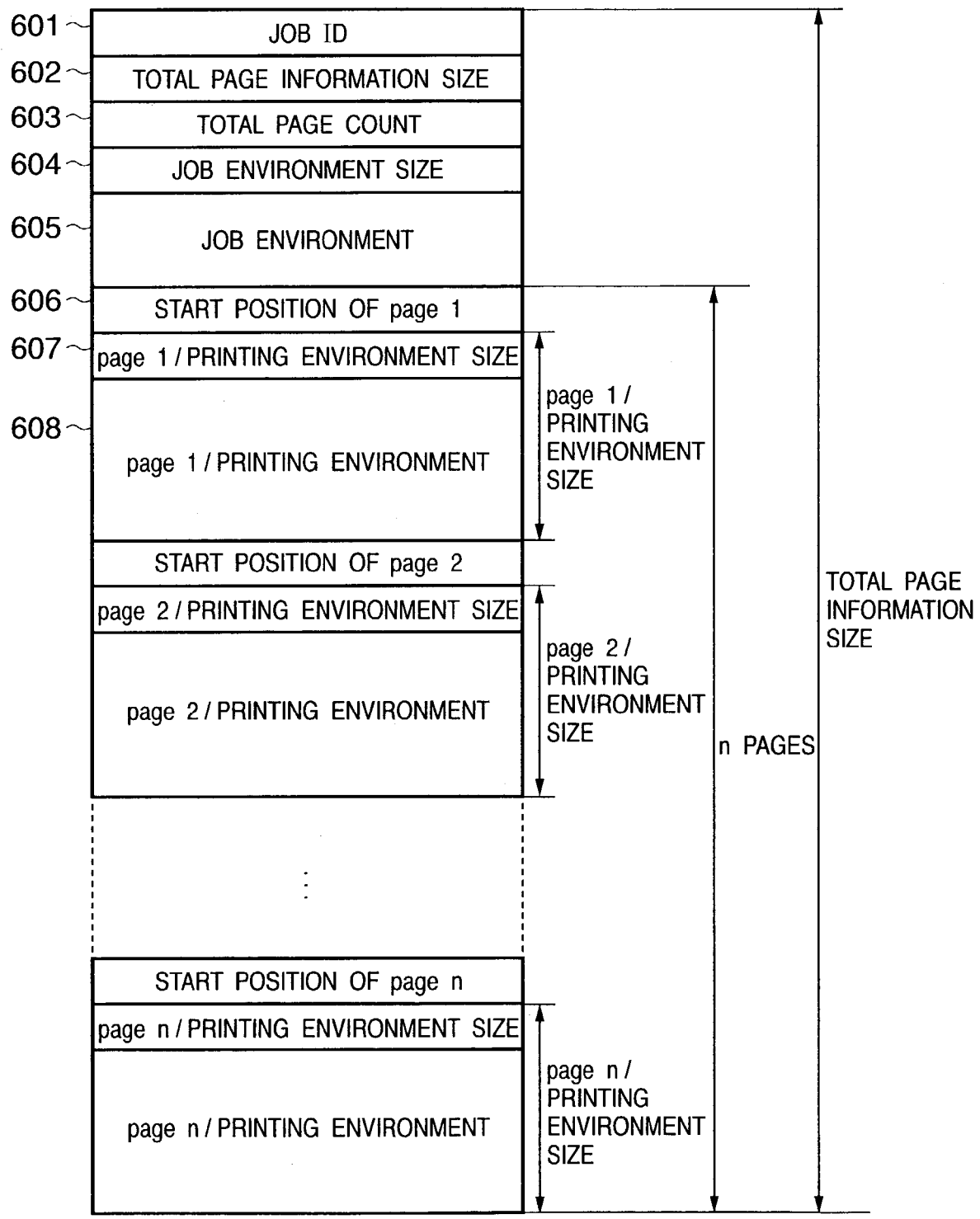
FIG. 14 is a view showing a structure (format to be stored in a hard disk) obtained by merging the page information and printing environment in FIGS. 10 and 11.

FIG. 14 shows a structure obtained by merging page information and the printing environment in FIGS. 10 and 11. This structure is a data structure stored as reprint data in the hard disk 310 at the end of a job. In FIG. 14, reference numeral 601 denotes a job ID corresponding to the job ID 1301; 603, a total page count n corresponding to the total page count n 1302; 606, a start position of page 1 corresponding to the start position 1303; 607 and 608, a printing environment data size and actual printing environment corresponding to the printing environment data size 1304 and actual printing environment 1305, respectively; and 605, a job environment which is a common printing environment throughout the print job and is formed from the designation content of a job control language (JL) designated by the format for the entire PDL data as print data. The job environment includes items such as the print resolution, print mode (double-sided/single-sided printing), binding width, binding direction, the presence/absence of stapling designation, and discharge port (faceup/facedown). Reference numeral 604 denotes a data size (number of bytes) of the job environment; and 602, a sum of all data. The job environment is stored in the work memory or the like at the start of the PDL.

A data structure when a page image (band raster) generated as a result of analyzing PDL data is stored as reprint data in the hard disk 310 after shipping will be described with reference to FIG. 15.

Figure 15:
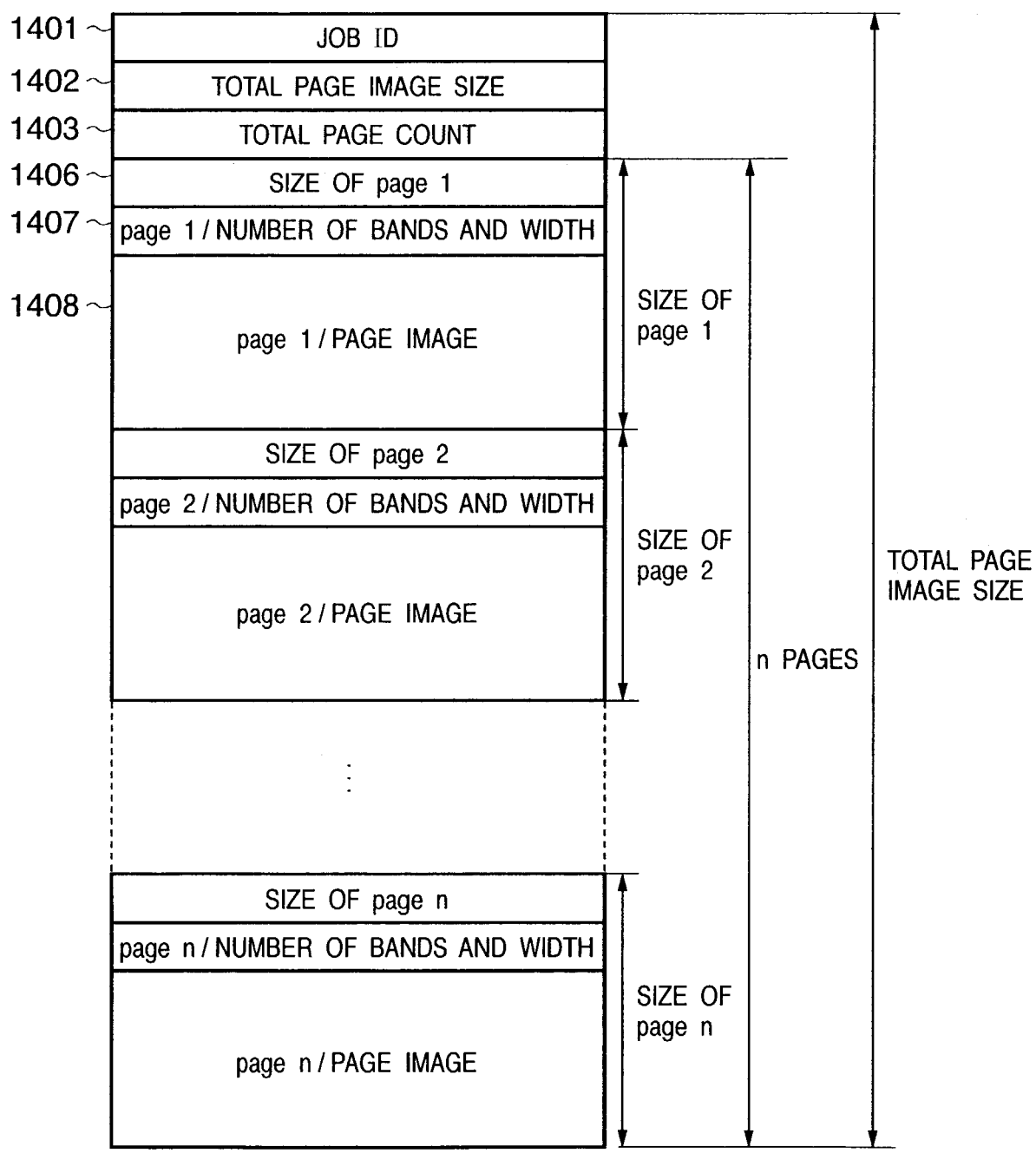
FIG. 15 is a view showing a data structure when a page image generated as a result of analyzing PDL data is stored in the hard disk 310.

In FIG. 15, reference numeral 1401 denotes a job ID corresponding to the job ID 1301 or the like; 1403, a total page count n; 1406, a total page image size of page 1; 1407, an information portion which changes every page and includes the number of bands of page 1, band width, and the byte size of each band raster (table for the number of bands); and 1408, an actual page image (by the number of bands). The page images and information portions of page 2 and subsequent pages are sequentially stored subsequent to the actual page image 1408. In addition to the above items, the information portion 1407 also includes items such as the print resolution, tone level (only for a multilevel image), a flag representing which of the obverse and reverse bears printed data, and the compression format when a band raster is compressed. If the print resolution cannot be changed within a job, the print resolution need not be prepared every page. Reference numeral 1402 denotes a data size of all page images (sum of the size of page 1 to the size of page n) for which a final value is stored at the end of a job.

Figure 13:
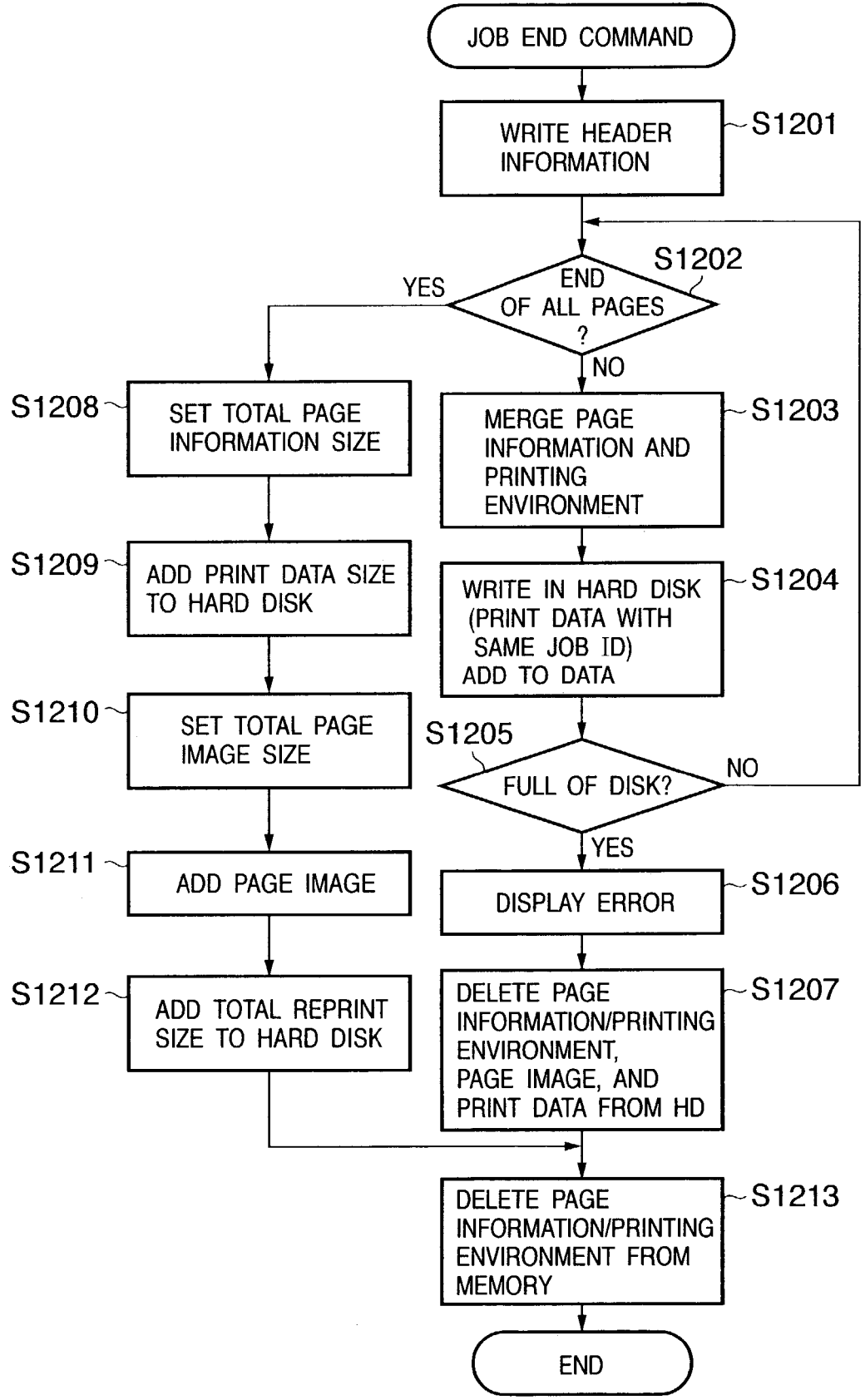
FIG. 13 is a flow chart showing a processing sequence (step S516 of FIG. 5) upon reception of a job end command as a print command in the embodiment.

A processing sequence upon reception of a job end command as a print command will be explained with reference to the flow chart of FIG. 13 (this processing sequence corresponds to processing in step S516 of FIG. 5). In step S1201 of FIG. 13, header information corresponding to pieces of information 601 to 605 in FIG. 14 is written in the hard disk (added to print data having the same job ID). Note that the total page information size 602 may be obtained at this time. It is also possible to write an indefinite value in order to ensure an area, calculate the sum while steps S1202 to S1205 are repeated, and set the page information size 602 at the end of the loop (this embodiment adopts the latter processing) The total page count 603 may be the processed-page count at the end of a job.

In step S1203, page information (FIG. 10) and the printing environment (FIG. 11) are merged. More specifically, page information and a printing environment having the same job ID as that of a print job in process are read out from the page information storage are 305b and printing environment storage are 305d, respectively, and merged into a structure of each page (step S1203). The merged information is added subsequent to print data having the same job ID in the hard disk, and the resultant data is written (step S1204). At this time, whether the hard disk becomes full is checked (step S1205), and if NO in step S1205, the flow returns to step S1202 in order to process the next page.

If YES in step S1205, an error is displayed on a panel or the like (step S1206), and a page image, print data, and page information/printing environment which are written in the hard disk are deleted (step S1207). Thereafter, all pieces of page information/printing environment in the RAM 305 before merge are deleted (step S1213). Although not shown in FIG. 5, the disk capacity is also checked in print data write in step S506. In this embodiment, when the disk capacity runs short, an error is displayed, ending the processing. Alternatively, only a page image may be deleted, leaving only print data and page information/printing environment.

If all pages are written without any error, the total sizes of page information and the printing environment are written (overwritten) in the area of the total page information size 602 in step S1208. In step S1209, the total size of print data (processed-data size at this time) is overwritten in an area corresponding to the print data size 1103 in the hard disk. The total page image size is set in the data size 1402 (step S1210). In step S1211, the page image is added (moved) subsequent to the page information/printing environment. The data size of the entire reprint data (total size of the print data, page information/printing environment, and image data) is overwritten in the area of the total reprint size 1102 (step S1212). Finally, the page information and printing environment in the RAM 305 are deleted, ending the processing (step S1213).

By this processing sequence, reprint data for a print job having a specific job ID is stored in the hard disk.

Figure 16:
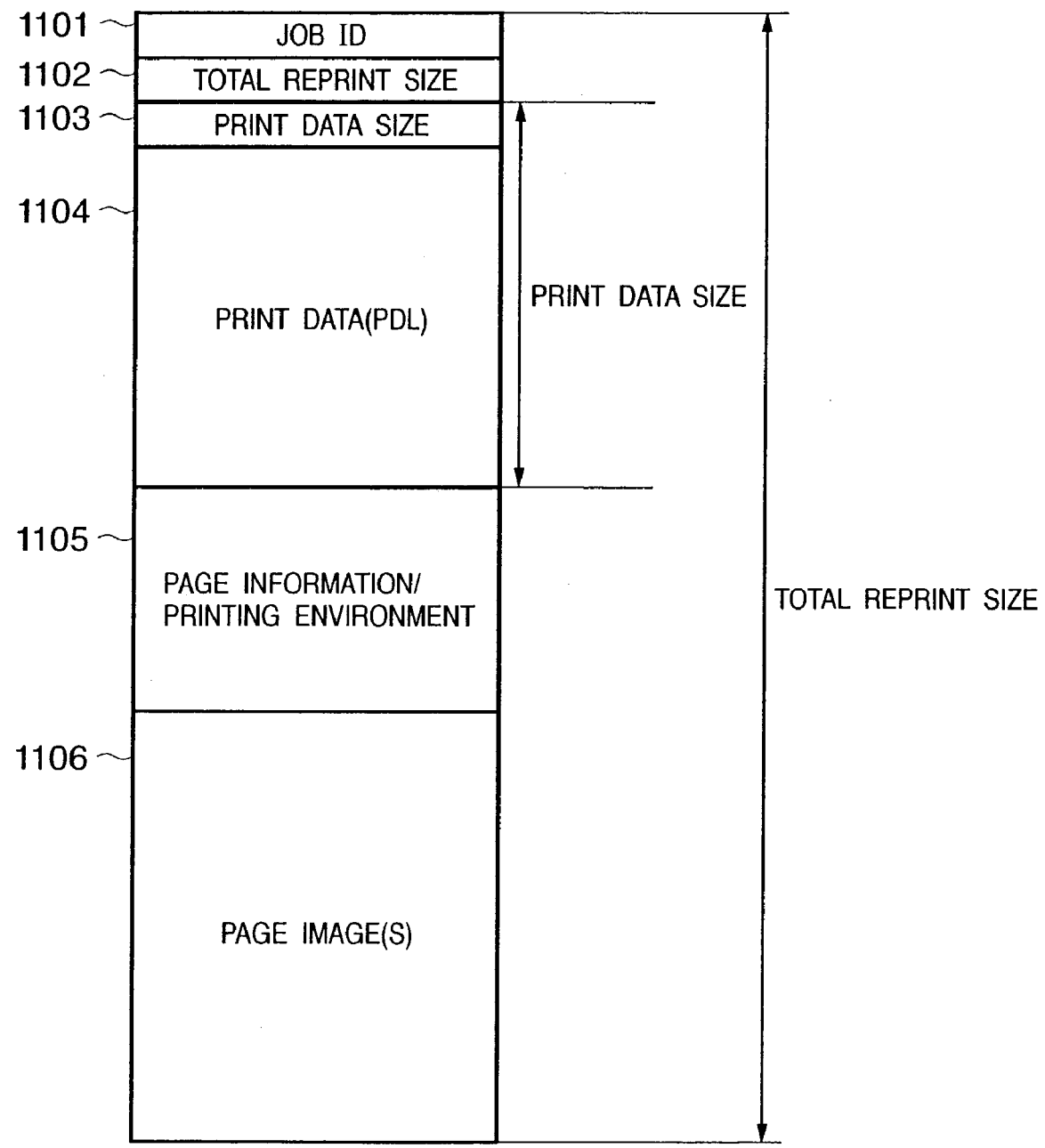
FIG. 16 is a view showing the whole structure of reprint data stored in the hard disk 310 upon reception of a job end command.

FIG. 16 is a view showing the whole structure of reprint data stored in the hard disk 310. In FIG. 16, the total reprint size 1102, print data size 1103, print data 1104, page information/printing environment 1105, and page image(s) 1106 which have not been determined at the start of a job in FIG. 6 are determined. The structure obtained by merging the page information and printing environment shown in FIG. 14 corresponds to the page information/printing environment 1105 in FIG. 16, and the page image structure in FIG. 15 corresponds to the page image(s) 1106 in FIG. 16.

Note that items having the same content such as the job ID need not be repetitively stored. Reprint data is managed with a file name uniquely determined in the hard disk according to a known disk management method (e.g., a print job with a job ID "100" is identified by a file name "RD00100"). In this embodiment, print data, page information/printing environment, and image data are stored as one file. However, the present invention is not limited to this, and a management table or the like may be prepared to individually manage print data, page information/printing environment, and image data in units shown in FIGS. 14 and 15.

<Example of Reprint Job Operation of Image Processing Apparatus According to Embodiment>

(Structural Example of Reprint Job Command)

The format of a print command which constitutes a print job for executing reprinting from the host computer to the image processing apparatus will be explained with reference to FIG. 17.

The start and end of a reprint job are described in a JL (Job Language), and include the following commands which designate various environments (job environments) uniform within the print job. For descriptive convenience, the job environment is the same as that in FIG. 4.

Job start command representing the start of a print job (job ID=JOBID' is designated as a parameter).

Print resolution designation command (600 dpi in this embodiment) which sets a print resolution used to process subsequent print data in the PDL data format Binding width setting command (5 mm) and binding direction setting command (left binding) that designate the mapping position of a print content on a sheet in binding the sheet Print surface designation command (double-sided) which designates whether to perform printing on one side or two sides of a sheet Discharge port selection command (discharge port 1=face-down)

PDL shift command which designates activation of a PDL analysis program in order to process print data (LIPS is activated)

These commands are JL commands (to be referred to as a job environment setting command hereinafter), and are described in the PDL.

PDL data start command representing the start of PDL data

Sheet size selection command (A4) which selects the sheet size of each page

Reprint mode setting command (mode=1) which designates a reprint mode

Reprint designation command (job ID/start page number/end page number) representing that the print job designates reprinting In this case, "reprint mode=0" means to reprint all pages in the same order as that in a general job. Similarly, 1=partial printing, 2=reverse printing, 3=reverse & partial printing, and 4=random printing. The parameter of the reprint designation command changes depending on the reprint mode as follows. That is, the parameter is interpreted as mode 0=parameter is unnecessary, mode 1=start and end pages, mode 2=no parameter, mode 3=start and end pages, and mode 4=the total number of pages to be reprinted and the order of page numbers (mode in which all pages subsequent to a designated page are reprinted may be employed).

PDL data end command which means the end of PDL data

Job end command which defines the end of the print job by the JL

In the above structure, reprint designation issued after any drawing command is made invalid (data is printed as a general print job). If an item not designated as a job environment exists in a print job designating reprinting, the item is processed as the same job environment as that of a general print job.

(Reprint Job Processing Sequence: Example of Checking Job Environment and Page Information)

A processing sequence upon reception of a print job designating reprinting shown in FIG. 17 will be explained with reference to the flow chart of FIG. 18. Note that a description of the same processing steps (901 and 902) as those in a general print job designating no reprinting will be omitted. This embodiment will exemplify only a case wherein partial printing of printing only part of a print job is designated.

In step S903, whether the reprint job is a job environment setting command by the job control language is checked. If YES in step S903, a designated job environment is stored in the work memory (step S916). In this case, the job environment is formed from the same items as those of the job environment 605 for a general print job, but setting contents (e.g., print resolution) may be different. If NO in step S903 (i.e., the print job is PDL data), whether the reprint job is a reprint mode setting command is checked (step S904). If YES in step S904, a reprint mode designated by the command parameter is checked. For example, mode=1 is designated and interpreted that partial printing is designated.

If NO in step S904, the whether the reprint job is a reprint designation command is checked in step S905. If NO in step S905, the reprint job is analyzed as another print command such as a sheet size setting command or PDL data end command, and predetermined processing is performed (step S917).

If YES in step S905, the reprint designation command is interpreted that partial printing is designated by the reprint mode, and the parameters are processed as a job ID, start page, and end page. Whether reprint data having the parameter-designated job ID has been stored in the hard disk is checked (step S906). If NO in step S906, the flow advances to processing of the next command (at this time, an error may be displayed, or start and end page parameters may be simultaneously checked). If YES in step S906, the page read range and read order are determined from the designated start page/end page and the job environment difference (step S907). For example, when the discharge face is determined to have been changed by a discharge port selection command as a result of comparing the printing environment 605 of a general job and the job environment in reprint designation, partial printing is substantially processed in a reverse order. Note that this embodiment assumes that reprinting is designated with the same print order as that of a general print job.

In steps S910 to S915 and S919, reprinting is done by print data analysis or page image read until print data reaches the parameter-designated end page. More specifically, whether print data is a print end page is checked in step S908, and if NO in step S908, whether the page image is reusable for a page to be processed is determined in step S909. If YES in step S909, a corresponding page image is read out from the hard disk in step S919, and copied to the band buffer 305c (for a compressed image, the image is decompressed). If NO in step S909, the page information and printing environment (606 and 608) of the page are read out from the hard disk (step S910), and the printing environment is set (step S911). After that, print data of the page is read out and analyzed, a corresponding drawing object and drawing information are generated (steps S912 and S913), and a page image is generated and output (step S914). The output page count is updated (incremented) in step S915, and the flow shifts to processing of the next page. Steps S912 to S914 are executed by the same sequence as that of processing a general print job other than reprint designation.

In this manner, reprinting is processed by switching every page between printing of a page by using a page image stored in the hard disk and printing of a page by reading out the page information and printing environment of the page stored in the hard disk and generating a page image. If a page image can be used, high-speed print processing can be achieved. Even if no page image is reusable, a page image is generated from page information and then printed. In either case, reprinting becomes possible.

For example, a print job assigned double-sided printing with a designated binding width is to be reprinted in single-sided printing with the same binding width. In this case, an odd-numbered page (page originally printed on the obverse) is determined in step S909 to be able to reuse a page image. An even-numbered page (page originally printed on the reverse) is determined to be subjected to reanalysis of PDL data (because the image shifts in opposite directions between the obverse and the reverse in double-sided printing).

(Example of Reprint Designation for Print Job with Designated Binding Width Other Than 0)

A processing sequence when print surface designation (double-sided printing or single-sided printing) is changed to designate reprinting for a print job to which a binding width other than 0 is designated will be explained with reference to FIG. 21 and the flow chart of FIG. 22. In this embodiment, print surface designation=double-sided, binding width=8 mm, and binding direction=left binding are designated as a job environment in storage to the hard disk. Further, print surface designation=single-sided, binding width=8 mm, and binding direction=left binding are designated as a reprint job environment.

FIG. 21 is a schematic view showing print results when a binding width other than 0 is set. In FIG. 21, reference numerals 2101 and 2103 denote an odd-numbered page (obverse) and an even-numbered page (reverse) in double-sided designation, respectively; and 2105 and 2107, pages (both of which are obverses) in single-sided designation. As is apparent from FIG. 21, when the binding width is designated, a print content is offset, but the image shifts in opposite directions between the obverse and the reverse in double-sided printing. In FIG. 21, reference numerals 2102, 2104, 2106, and 2108 denote printable regions on sheets, i.e., effective print regions. In this case, the effective print region is set inward by 5 mm from upper, lower, right, and left sheet ends. The band buffer 305c for rasterizing a drawing object is so assigned as to coincide with the effective print region. The print position within the drawing information (application) 805 is set using the upper left end of the band buffer as an origin. In addition, the print position is calculated by adding a print position designated by each drawing command in the PDL and a binding width set in the job environment. If the binding width is changed, a page image to be rasterized is also changed. Hence, a page image on the reverse in double-sided printing is not the same as that in single-sided printing with the same binding width.

Figure 22:
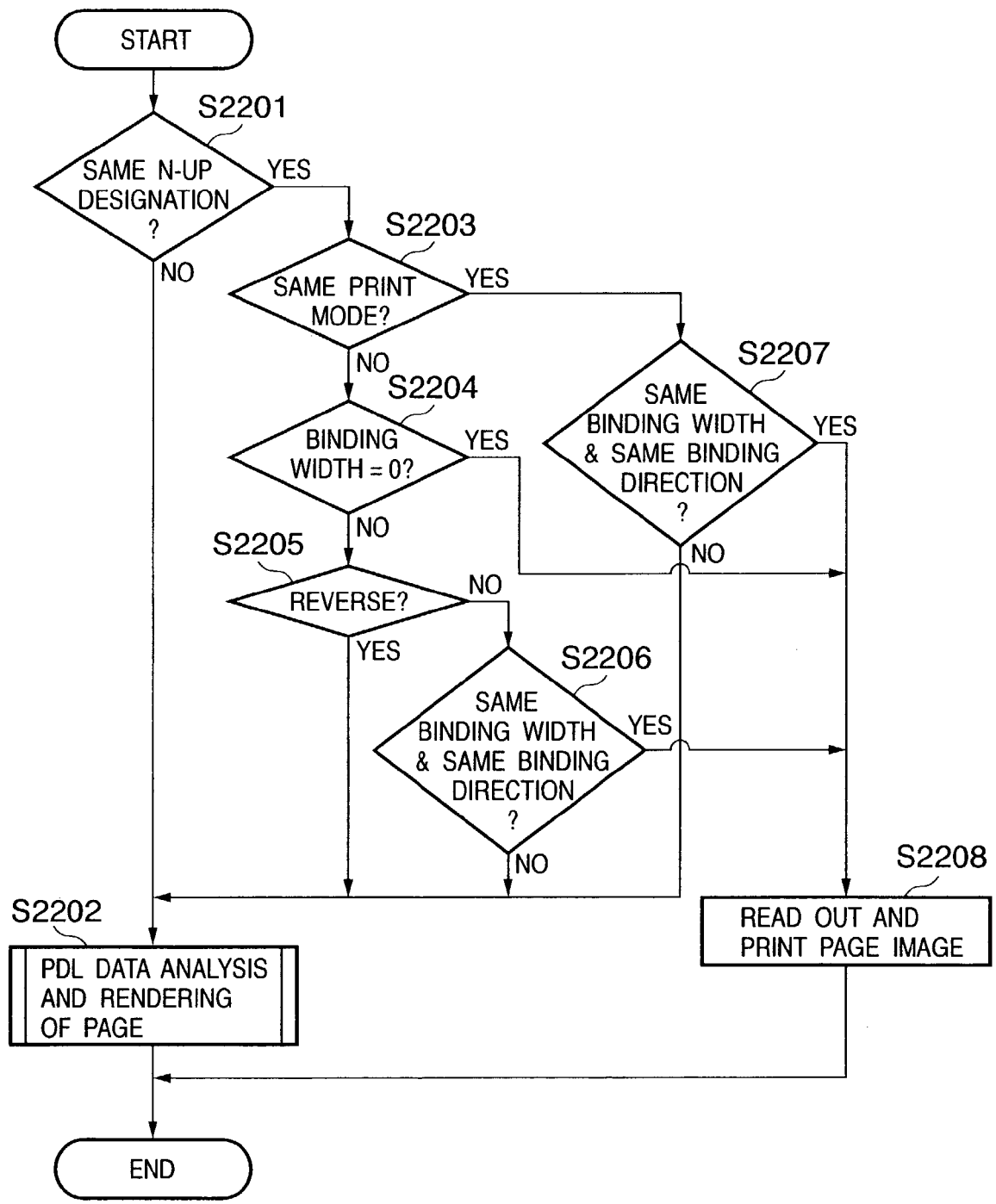
FIG. 22 is a flow chart showing a sequence of determining whether each page image is reusable, in reprint designation according to the embodiment for explaining a case wherein the print mode (double-sided/single-sided printing) is changed and reprinting is designated.

The flow chart of FIG. 22 shows a sequence of determining whether each page image(s) 1106 stored in the hard disk is reusable in reprint designation. This sequence corresponds to steps S909 to S914 and S919 in FIG. 18. In steps of FIG. 22, whether the page image is reusable is determined by comparing the job environment 605 stored in the hard disk and the job environment of a reprint-designated print job. Details of the sequence will be explained.

In step S2201 of FIG. 22, whether designation for printing of a plurality of pages (layout printing or N-up) is kept unchanged is checked. If designation for printing of a plurality of pages is "four pages/sheet" (4-up), PDL-designated print data of each page is reduced to generate a drawing object such that each page falls within a region prepared by dividing one sheet, i.e., sheet surface into four. If the setting for printing of a plurality of pages changes, a different page image must be generated and output. For this reason, the printing environment 608 of a target page is read out and set in step S2202 corresponding to steps S910 to S914, and then PDL data is analyzed and rendered to perform reprint processing.

If the setting for printing of a plurality of pages is determined in step S2201 to be kept unchanged, the binding width and print surface are compared in step S2203 and subsequent steps. More specifically, whether the print mode (single-sided printing or double-sided printing) is kept unchanged is checked in step S2203, and if YES in step S2203, whether the binding width and binding direction are kept unchanged is checked (S2207). If all these job environments are kept unchanged, a stored page image is determined to be reusable, and read out from the hard disk for printing (S2208 corresponding to S919). If NO in step S2203, whether the binding width is 0 is checked in step S2204. If the binding width value is 0 in both storage and reprint designation (or no binding width is designated), the page image is determined to be reusable regardless of the print surface.

If either binding width is not 0 (NO in step S2204), the processing branches in step S2205 depending on whether the print surface is an obverse or reverse. If a page to be output is a reverse (YES in step S2205), the page image is determined to be changed regardless of binding width designation, and the flow shifts to step S2202 in order to reanalyze the PDL.

In this case, the page image is determined to be always reusable for the reverse. However, when the binding direction is reversely reset with the same binding width, the page image is reusable. Thus, the page image reuse frequency may be increased by adding condition decision. In this case, the page image on the obverse cannot be reused, and condition decision must be added after YES in step S2206. If NO in step S2205, whether the binding width and binding direction are kept unchanged is checked (S2206). If YES in step S2206, the page image is reused; if NO, a page image is generated again from PDL data of the page.

As described in detail above, whether the page image is reusable is determined every print condition (job environment), and reprint processing is done by properly referring to the page image or PDL data on the basis of the determination result. In reanalysis of PDL data, the start position 606 and printing environment 608 of each page in the PDL are referred to. This obviates the need for reanalyzing the PDL from the start, and reprint processing can be executed at a high speed.

In this embodiment, whether the page image is reusable is determined based on the designation contents of N-up designation, print mode, binding direction, and binding width for descriptive convenience. In general, various print conditions such as color mode and print resolution are also compared in addition to the above conditions.

By the above-described sequence, print data is reanalyzed only for a page which cannot reuse a page image. Reprint processing can be executed from an arbitrary page at a high speed.

(Reprint Job Processing Sequence: Example of Partial Printing with Changed Job Environment)

A detailed example of a reprint job assigned partial printing with a designation different from a job environment in PDL data storage will be described with reference to FIGS. 23 and 24. This embodiment will exemplify reprinting with a changed N-up designation content as a job environment.

Figure 23:
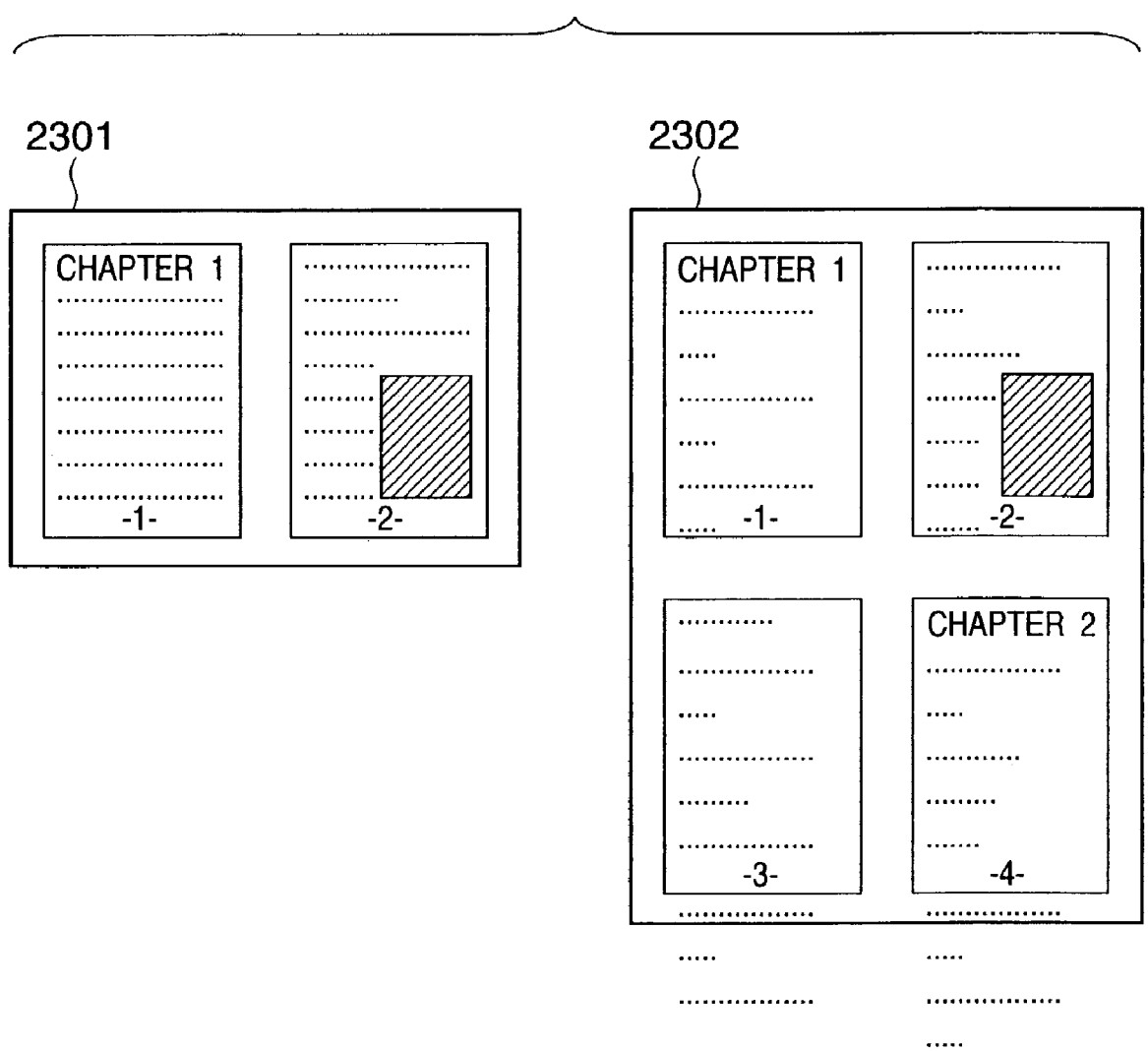
FIG. 23 is a schematic view showing output results (for one sheet) by N-up designation according to the embodiment.

FIG. 23 shows output results (for one sheet) by N-up designation. Reference numeral 2301 denotes a result of outputting the first and second pages in "two pages/sheet" designation; and 2302, a result of outputting the first to fourth pages in "four pages/sheet" designation. When N-up designation (output page format) is changed as a job attribute, as illustrated in FIG. 23, the size and layout of characters to be drawn change. Hence, the page image(s) 1106 held in the HDD at the same time as reception of PDL data cannot be directly reused.

Figure 17:
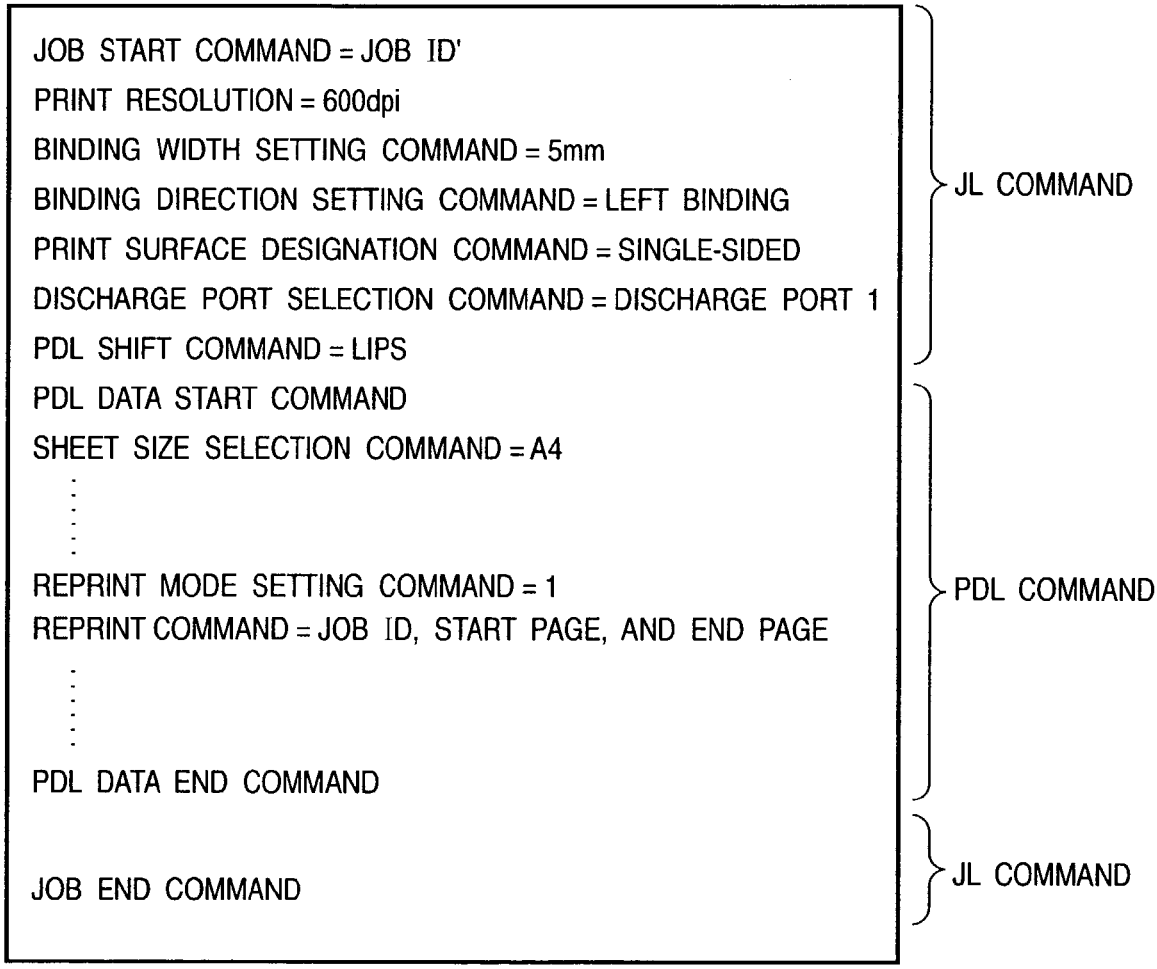
FIG. 17 is a view showing an example of a print job (print command) for executing reprinting from the host computer to the image processing apparatus.

N-up is designated by the job environment setting command (JL language) shown in, e.g., FIG. 17. For example, for "two pages/sheet", "NUP=2in1" is designated. This designation content is directly stored in the job environment 605, and compared with the reprint job designation content as one of conditions of deciding whether a stored page image is reusable. Drawing contents described in the PDL at this time are the same as those described when no N-up designation exists or "one page/sheet" is designated as N-up. The drawing data analyzer 303*b* determines a reduction ratio corresponding to the N-up designation content, and the position, i.e., layout of each page within a sheet. The drawing object 806 and drawing information 805 are generated while the character size and drawing position designated by each drawing command are corrected.

In this embodiment, partial printing is designated by reprint mode=1, and start and end pages are designated as reprint designation command parameters. A case wherein the start page is 5, the end page is 8, and the contents of four pages from page 5 to page 8 are output on one sheet by "four pages/sheet" will be described. A reprint processing sequence at this time complies with the flow chart of FIG. 18. The page range determined in step S907 is "5 to 8" from the start page to the end page. In step S915, the page count is updated in an ascending order, i.e., the processed-page count is incremented by one. In determination processing in step S909 for whether the page image is reusable, "page image is not reusable" is determined for all pages (determination result is always NO) because the N-up designation content in the job environment changes, as described above. PDL data describing a target page is read out in steps corresponding to steps S910 to S914, and analyzed in accordance with a job environment designated by the reprint job.

The processing contents of steps S910 and S911 will be further explained with reference to FIG. 24. FIG. 24 shows the whole structure of reprint data, similar to FIG. 16, and the same reference numerals denote the same parts. FIG. 24 shows the relationship between each page start position 606 in the page information 1105 and the print data (PDL data) 1104, and the byte offset value from the start of PDL data is stored as a page start position. Each page start position can be calculated from the number of PDL data bytes processed until each page image is generated. For example, the start position of the first page is the "1"st byte, that of the second page is the "1024"th byte, and that of the nth page as a final page is the "30321"st byte. Each value changes depending on the described PDL (drawing content).

Figure 24:
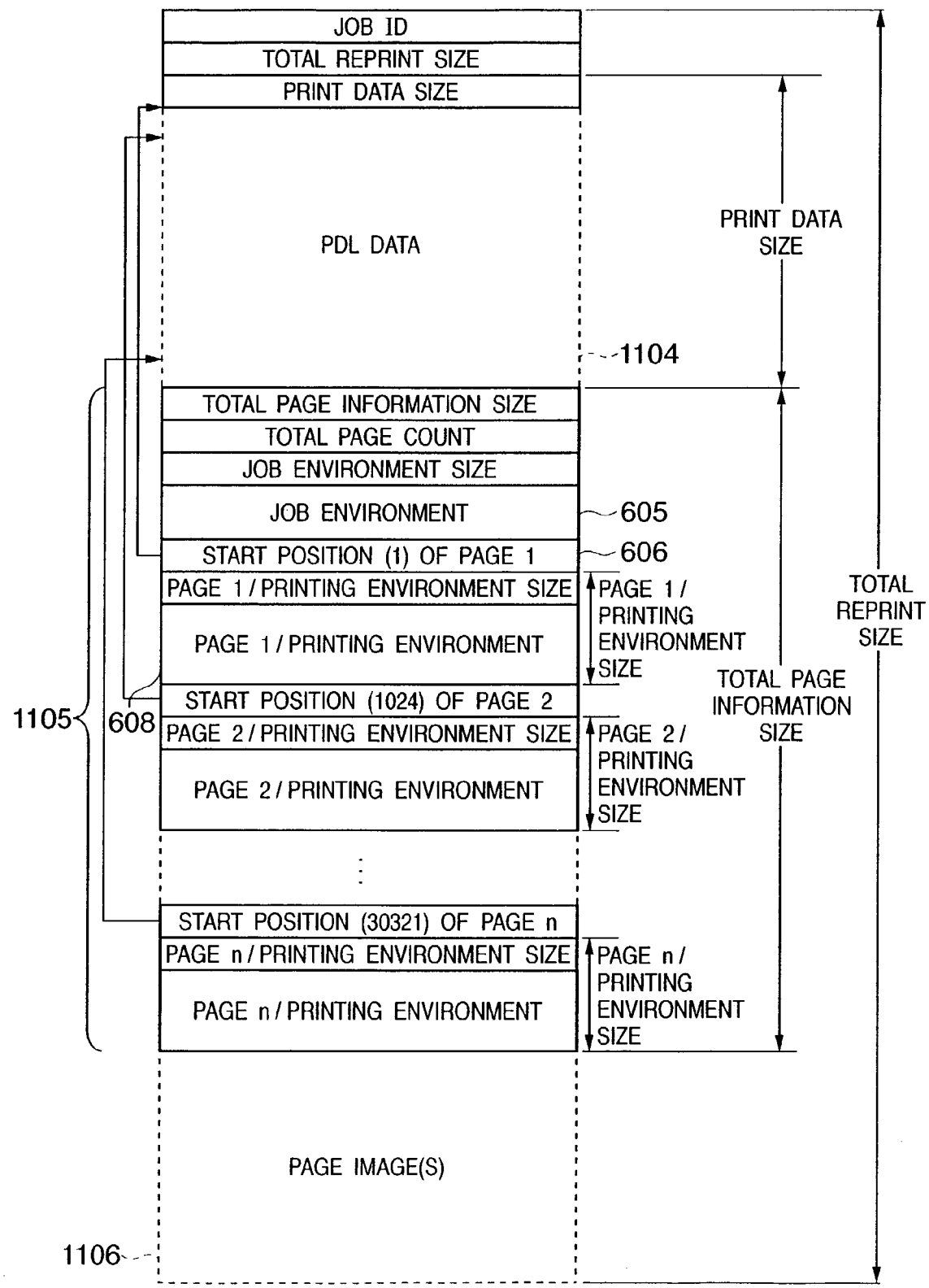
FIG. 24 is a view showing the relationship between PDL data, the start position of each page, and the whole structure of reprint data stored in the hard disk 310 upon reception of a job end command.

In reprinting assigned partial printing, the start of page information is obtained based on the print data size in FIG. 24, and the start position 606 of a page to be output is obtained from the job environment size and the printing environment size of the page (S910). The printing environment 608 of the page that is stored immediately after the obtained start position is read out and set as a current graphic state. PDL data is analyzed from a byte position represented by the start position 606.

When N-up (in this case, "two pages/sheet") is assigned to reprint data itself stored in the HDD, a reduction ratio corresponding to "two pages/sheet" designation, a coordinate-converted print size and print position (CAP) information, and the like are stored in the printing environment 608. After restore to a non-N-up designation state, information must be rewritten in correspondence with "four pages/sheet". Processing of returning to the value of the non-N-up designation state is inverse transform with respect to processing of N-up printing, and a detailed description thereof will be omitted.

In this embodiment, for descriptive convenience, the PDL of a page analyzed after the printing environment 608 is read out from the HDD every page and set as a current graphic state. However, the printing environment of only the first reprint page suffices to be read out and set as far as the reprint mode has an ascending print order, and the printing environment of a subsequent page need not be read out. This processing allows outputting reprint data by partial printing designation at a higher speed.

(Reprint Job Processing Sequence: Another Partial Printing Example)

FIG. 25 shows reprinting assigned partial printing, similar to the above example, when the same "four pages/sheet" as that in storage is designated as a job environment.

In FIG. 25, reference numeral 2501 denotes a content of the first three page images (first to 12th pages) out of page images stored as reprint data in the HDD; and 2502, an output result of partial printing with the start page=4 and the end page=11. As shown in FIG. 25, to start from an intermediate page on a sheet or end at an intermediate page on a sheet, the stored page image(s) 1106 may not be reused for the first sheet (2503) or final sheet (2505) even with the same N-up designation. However, a stored page image can be reused for an intermediate sheet (2504), and this page image is read out and output. Whether the page image(s) 1106 is reusable is determined by checking whether partial printing starts from an intermediate page on a sheet. That is, partial printing can be determined to start from the middle of a sheet unless the start page as a reprint mode parameter is "4n+1" (n is an integer of 0 or more). "Page image is not reusable" is determined until the page count during reprint processing reaches "4(n+1)+1". PDL data is reanalyzed, and reprint processing is performed.

Since a page outside the range designated by partial printing is not drawn in this embodiment, a page image may not be reused even with the same N-up designation, as described above. If all pages belonging to the same sheet can be drawn, page images 1106 can be reused for all sheets to perform reprint processing at a high speed.

In this manner, when the print attribute is not changed in partial printing from a desired page of the print data, high-speed printing is done using a page image stored in the hard disk. If the print attribute is changed, a page image is generated again from page information and print settings stored in the hard disk, and the generated page image is printed. An image forming apparatus capable of coping with any reprinting can be provided.

(Reprint Job Processing Sequence: Example of Not Checking Job Environment and Page Information)

Figure 18:
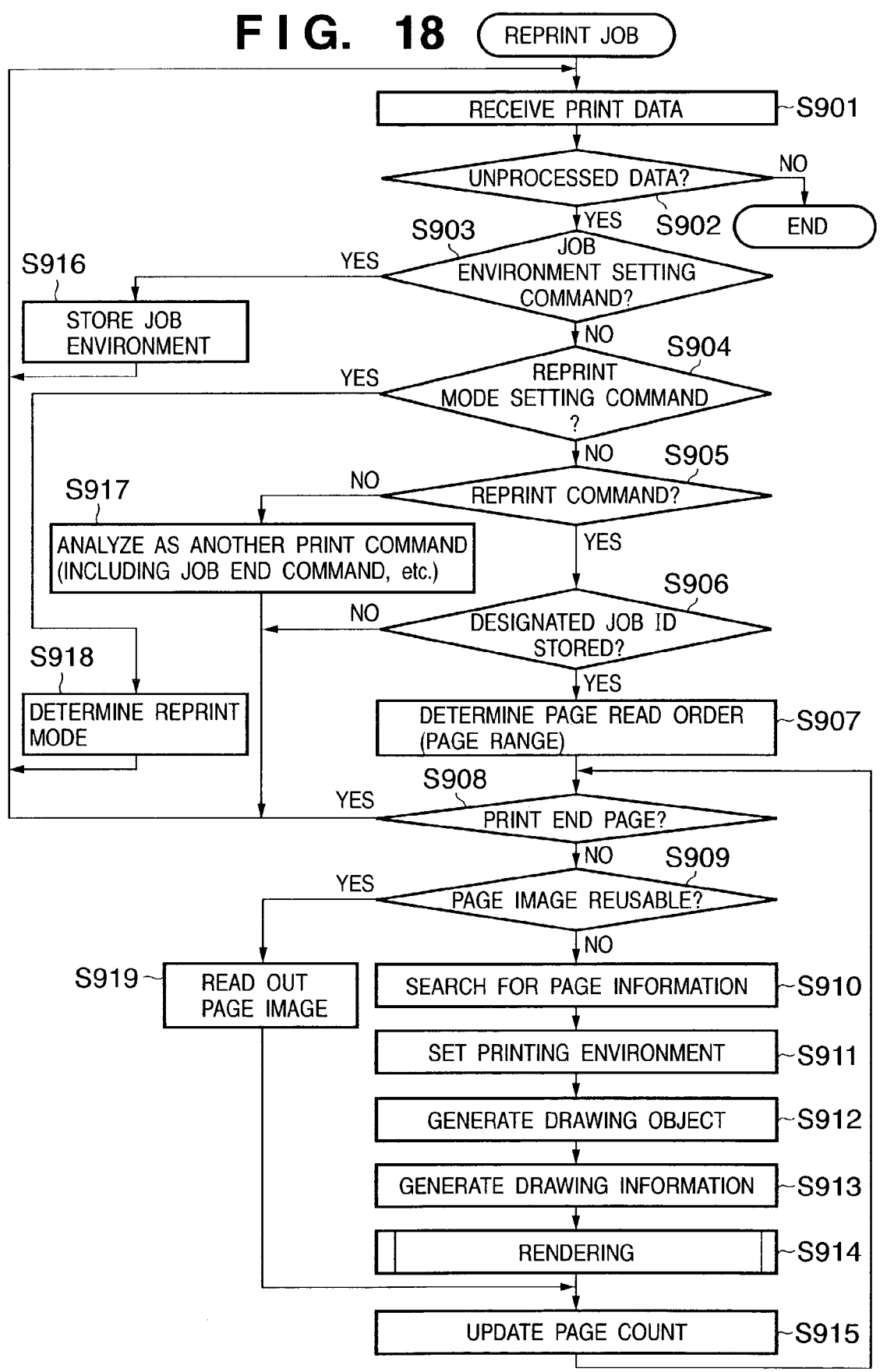
FIG. 18 is a flow chart showing a processing sequence upon reception of a reprint designation command as a print command in the embodiment.

In the example of FIG. 18, the job environment and page information are compared between a reprint-designated print job and reprint data spooled in the hard disk. While checking whether the page image of each page is reusable, reprint processing is executed. Depending on the reprint mode designation content, the same content may be designated to be simply output again without comparing the page information and the like.

This reprint processing sequence will be explained with reference to the flow chart of FIG. 19.

Figure 19:
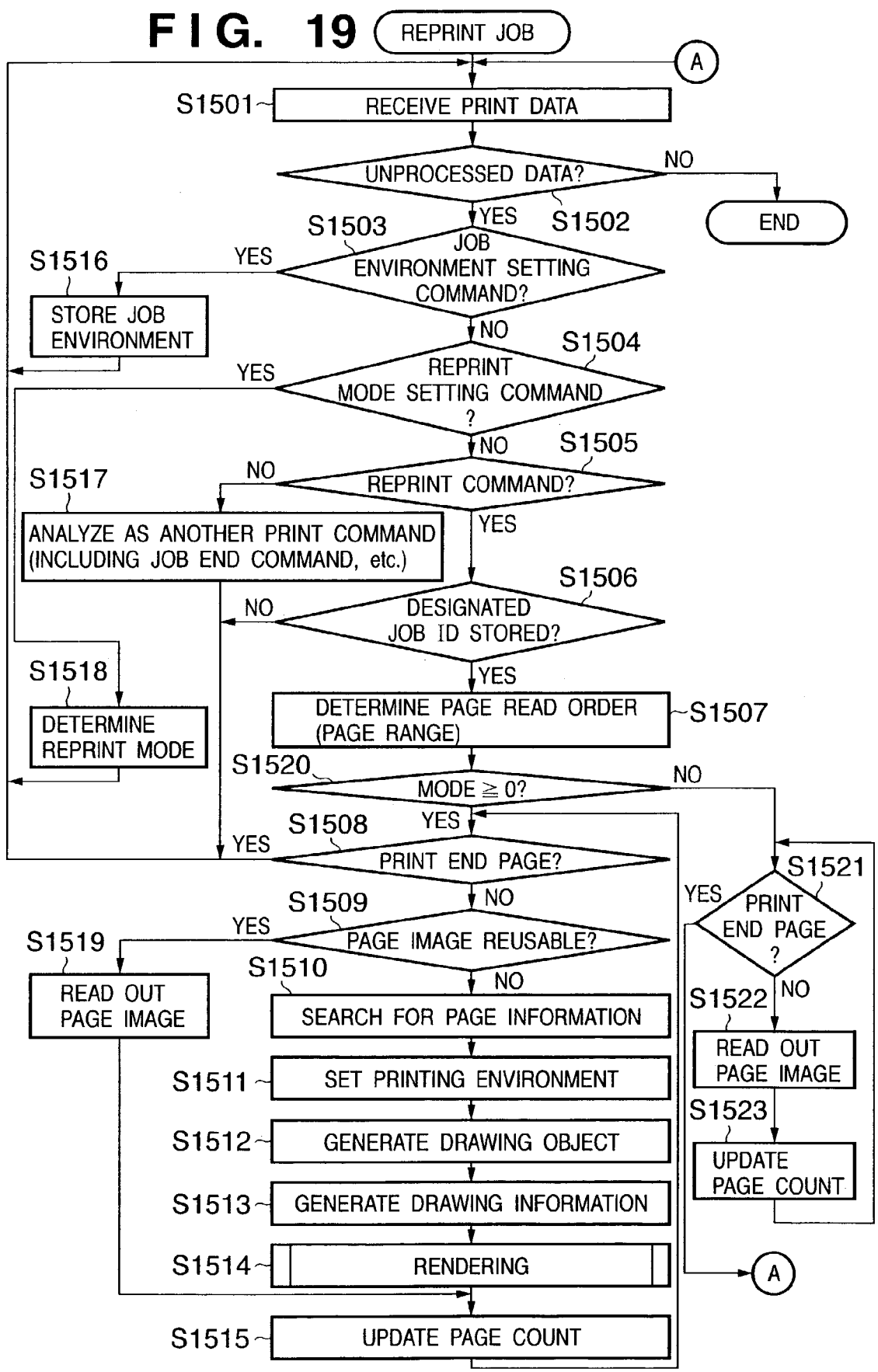
FIG. 19 is a flow chart showing another processing sequence upon reception of a reprint designation command as a print command in the embodiment.

In FIG. 19, steps S1501 to S1519 are basically the same as steps S901 to S919 in FIG. 18, and a detailed description thereof will be omitted.

In this embodiment, "−1" and "−2" can be additionally designated as reprint modes. In these modes, page images are reusable for all pages. Reprint mode=−1 represents to reprint all pages in the storage order, and reprint mode=−2 represents to reprint all pages in an order reverse to the storage order from the final page. In this embodiment, reprint mode=−1 is designated.

In FIG. 19, if print data read out from the reception buffer is a reprint designation command (step S1505) and reprint data corresponding to a job ID designated by the parameter has been stored in the hard disk (step S1506), the page read order is determined in accordance with the reprint mode in step S1507. Since the reprint mode is "−1", the reprint start page is the first page, and the end page is the final page of the print job.

In step S1520, the processing branches depending on whether the reprint mode is equal to, higher than, or smaller than 0. For the reprint mode≧0, reprinting is performed while the job environment and page information are compared every page and whether a page image is reusable in a reprint-designated environment is checked, as described in the above-described example. For the reprint mode<0, reprinting (multiple-copy printing) is performed using a stored page image without comparing the environment. More specifically, whether pages have been reprinted up to the end page is checked in step S1521. If YES in step S1521, reprint processing ends, and the flow returns to step S1501 in order to process the next print data. If NO in step S1521, each page image is read out from the hard disk at the same time as shipping operation, and reprint processing is executed. The processed-page count used for determination in step S1521 is updated (incremented) (step S1523), and the flow advances to processing of the next page.

Although not shown in FIG. 19, for reprint mode=−2, start and end pages are exchanged, and reprint processing starts from a page designated as an end page in step S1507. In step S1523, the page count is updated not by increment but by decrement. Steps except these steps are the same as those for reprint mode=−1.

When the same content is simply reprinted by the above-described sequence, reprinting (multiple-copy printing) can be done using a generated page image at a high speed without comparing the job environment and the like.

In this embodiment, a case wherein the page read order in reverse printing or book printing (random) designated as reprinting is different from that of the first print processing has not been described in detail. However, it is apparent that the present invention can be practiced in various modes with different read orders or all other reprint mode settings by referring to the system configuration, data structures, and flow charts of the embodiment. These modifications are also incorporated in the scope of the present invention.

The present invention may be applied to a system constituted by a plurality of devices (e.g., a host computer, interface device, reader, and printer) or an apparatus (e.g., a copying machine or facsimile apparatus) formed from a single device.

The object of the present invention is also achieved when a storage medium (or recording medium) which stores software program codes for realizing the functions of the above-described embodiment is supplied to a system or apparatus, and the computer (or the CPU or MPU) of the system or apparatus reads out and executes the program codes stored in the storage medium. In this case, the program codes read out from the storage medium realize the functions of the above-described embodiment, and the storage medium which stores the program codes constitutes the present invention. The functions of the above-described embodiment are realized when the computer executes the readout program codes. Also, the functions of the above-described embodiment are realized when an OS (Operating System) running on the computer performs part or all of actual processing on the basis of the commands of the program codes.

The functions of the above-described embodiment are also realized when the program codes read out from the storage medium are written in the memory of a function expansion card inserted into the computer or the memory of a function expansion unit connected to the computer, and the CPU of the function expansion card or function expansion unit performs part or all of actual processing on the basis of the commands of the program codes.

When the present invention is applied to the storage medium, the storage medium stores program codes corresponding to the above-described flow charts (shown in FIGS. 5, 13, 18, 19, and 22).

The present invention can provide an image processing method and apparatus capable of easily reprinting the same print data in various output forms at a high speed without any large-capacity storage device.

More specifically, according to the present invention, PDL data and a bitmap image are spooled together in the first printing. In reprinting, whether the printing environment has been changed is checked. If a generated bitmap image representing the content of one page is reusable, the bitmap image is reused to perform reprinting at a high speed. Only in reprinting with a different page content, the PDL data is reanalyzed to perform printing. This can increase the reprint processing speed.

According to the present invention, the page start position in PDL data and the current graphic state at the start of each page are held. Even an image processing apparatus using the PDL which allows inheriting various current graphic states between pages need not analyze data sequentially from the start of a print job. Reprinting of printing some pages from an intermediate page of the print job can be processed at a high speed.

The bitmap image is not reused only when the printing environment is changed. In reprinting after double-sided printing with a set binding width is changed to single-sided printing, PDL data is reanalyzed for only a reverse page, and a bitmap image can be reused for an obverse page.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus which generates a page image corresponding to print data input from an external device, comprising:
   an analysis unit adapted to analyze the print data to generate a page image;
   a print data spool unit adapted to hold the print data;
   an image spool unit adapted to hold a page image of each page obtained as an analysis result of said analysis unit;
   a determination unit adapted to, when reprinting is designated, determine whether to read out the print data held in the print data spool unit or the page image held in the image spool unit, using first print setting information set for data to be reprinted and second print setting information which is newly designated for reprinting; and
   a printing unit adapted to, when said determination unit has determined to read out the page image, print using the page image, and when said determination unit has determined to read out the print data, print using the print data and the second print setting information,
   wherein said determination unit determines to read out the page image for an odd-numbered page and reading out the print data for an even-numbered page when double-sided printing with a desired binding width is designated as the first print setting information and single-sided printing with the desired binding width is designated as the second print setting information.

2. The apparatus according to claim 1, wherein a printing environment check unit determines whether to reuse the page image or reanalyze the print data, at least once for one print job in a page unit.

3. The apparatus according to claim 1, wherein said analysis unit comprises a page information generation unit adapted to analyze the print data to generate a page image and to output the page information of the print data, and wherein said print data spool unit holds the print data and the page information together.

4. The apparatus according to claim 3, wherein the page information includes a start position of each page in the print data.

5. The apparatus according to claim 4, wherein the page information also includes printing environment information at start of each page.

6. The apparatus according to claim 4, wherein said printing unit comprises a first determination unit adapted to determine a change of a print order of pages from a print designation, read out a page start position from the page information in an order complying with a result of said first determination unit, and print the page image in the order.

7. The apparatus according to claim 5, wherein the printing environment includes various current graphic states necessary for drawing.

8. The apparatus according to claim 5, wherein said printing unit comprises a first determination unit adapted to determine a change of a print order of pages from a print designation, set a print environment by reading out a page start position and the printing environment information from the page information in an order complying with a result of said first determination unit, and print the page image in the order.

9. The apparatus according to claim 1, wherein the page image includes a set of image data obtained by dividing one page into a plurality of bands, or image data of one page.

10. The apparatus according to claim 1, further comprising a checking unit adapted to check whether the page image can be stored in said image spool unit, wherein, when the page image is determined not to be able to be stored, only the print data is stored in said print data spool unit.

11. The apparatus according to claim 1, wherein said printing unit comprises a second determination unit adapted to, when partial printing from a desired page of the print data is designated, determine for a designated page whether the page image is reusable, and reuse the page image in accordance with a determination result by said second determination unit.

12. An image processing method of generating a page image corresponding to print data input from an external device, comprising:
   an analysis step of analyzing the print data to generate a page image;
   a print data spool step of holding the print data;
   an image spool step of holding a page image of each page obtained as an analysis result in said analysis step;
   a determination step of, when reprinting is designated, determining whether to read out the print data held in the print data spool unit or the page image held in the image spool unit, using first print setting information set for the print data to be reprinted and second print setting information which is newly designated for reprinting; and a printing step of, when said determination step has determined to read out the page image, printing using the print data and the second print setting information, wherein said determination step determines to read out the page image for an odd-numbered page and reading out the print data for an even-numbered page when double-sided printing with a desired binding width is designated as the first print setting information and single-sided printing with the desired binding width is designated as the second print setting information.

13. The method according to claim 12, wherein in a printing environment check step, whether to reuse the page image or reanalyze the print data is determined at least once for one print job in a page unit.

14. The method according to claim 12, wherein said analysis step comprises a page information generation step of analyzing the print data to generate a page image and outputting the page information of the print data, and in the print data spool step, the print data and the page information are held together.

15. The method according to claim 14, wherein the page information includes a start position of each page in the print data.

16. The method according to claim 15, wherein the page information also includes printing environment information at start of each page.

17. The method according to claim 15, wherein said printing step comprises a first determination step of determining a change of a print order of pages from a print designation, a page start position is read out from the page information in an order complying with a determination result, and the page image is printed in the order.

18. The method according to claim 16, wherein the printing environment includes various current graphic states necessary for drawing.

19. The method according to claim 16, wherein said printing step comprises a first determination step of determining a change of a print order of pages from a print designation, a printing environment is set by reading out a page start position and the printing environment information from the page information in an order complying with a determination result, and the page image is printed in the order.

20. The method according to claim 12, wherein the page image includes a set of image data obtained by dividing one page into a plurality of bands, or image data of one page.

21. The method according to claim 12, wherein said image spool step comprises a step of checking whether the page image can be stored, and when the page image is determined not to be able to be stored, only the print data is stored in the print data spool step.

22. The method according to claim 12, wherein said printing step comprises a second determination step of, when partial printing from a desired page of the print data is designated, determining for a designated page whether the page image is reusable, and the page image is reused in accordance with a determination result.

23. A computer-readable medium storing an image processing program of generating a page image corresponding to print data input from an external device, said program comprising:

an analysis step of analyzing the print data to generate a page image;

a print data spool step of holding the print data of at least one job;

an image spool step of holding a page image of each page obtained as an analysis result in said analysis step;

a determination step of, when reprinting is designated, determining whether to read out the print data held in the print data spool unit or the page image held in the image spool unit, using first print setting information set for data to be reprinted and second print setting information which is newly designated for reprinting; and a printing step of, when said determination step has determined to read out the page image, printing using the page image, and when said determination unit has determined to read out the print data, printing using the print data data and the second print setting information, wherein said determination step determines to read out the page image for an odd-numbered page and to read out the print data for an even-numbered page when double-sided printing with a desired binding width is designated as the first print setting information and single-sided printing with the desired binding width is designated as the second print setting information.

24. The program according to claim 23, wherein in a printing environment check step, whether to reuse the page image or reanalyze the print data is determined at least once for one print job in a page unit.

25. The program according to claim 23, wherein said analysis step comprises a page information generation step of analyzing the print data to generate a page image and outputting the page information of the print data, and in the print data spool step, the print data and the page information are held together.

26. The program according to claim 23, further comprising a step of checking whether the page image can be stored in the image spool step, and when the page image is determined not to be able to be stored, only the print data is stored in the print data spool step.

27. The program according to claim 23, wherein said printing step comprises a first determination step of determining a change of a print order of pages from a print designation, a page start position is read out from the page information in an order complying with a determination result, and the page image is printed in the order.

28. The program according to claim 23, wherein said printing step comprises a first determination step of determining a change of a print order of pages from a print designation, a printing environment is set by reading out a page start position and the printing environment information from the page information in an order complying with a determination result, and the page image is printed in the order.

29. The program according to claim 23, wherein said printing step comprises a second determination step of, when partial printing from a desired page of the print data is designated, determining for a designated page whether the page image is reusable, and the page image is reused in accordance with a determination result.

* * * * *